(12) United States Patent
Endo

(10) Patent No.: US 11,925,867 B2
(45) Date of Patent: Mar. 12, 2024

(54) DRIVING ASSESSMENT DEVICE, DRIVING ASSESSMENT METHOD, AND NON-TRANSITORY RECORDING MEDIUM

(71) Applicant: TOYOTA JIDOSHA KABUSHIKI KAISHA, Toyota (JP)

(72) Inventor: Masato Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/678,532

(22) Filed: Feb. 23, 2022

(65) Prior Publication Data

US 2022/0288495 A1 Sep. 15, 2022

(30) Foreign Application Priority Data

Mar. 10, 2021 (JP) ................................ 2021-038777

(51) Int. Cl.
*A63F 13/67* (2014.01)
*A63F 13/65* (2014.01)
*A63F 13/798* (2014.01)

(52) U.S. Cl.
CPC .............. *A63F 13/67* (2014.09); *A63F 13/65* (2014.09); *A63F 13/798* (2014.09); *A63F 2300/558* (2013.01); *A63F 2300/6027* (2013.01); *A63F 2300/69* (2013.01); *A63F 2300/807* (2013.01)

(58) Field of Classification Search
CPC ...... G09B 19/167; G09B 19/16; G09B 19/14; G09B 9/042; A63F 13/67; A63F 13/65; A63F 13/798; A63F 13/211; A63F 13/216; A63F 13/245; A63F 13/428; A63F 13/21; A63F 13/46; A63F 13/58; A63F 13/803; A63F 2300/558; A63F 2300/6027; A63F 2300/69; A63F 2300/807; A63F 2300/8017
See application file for complete search history.

(56) References Cited

U.S. PATENT DOCUMENTS

| | | | |
|---|---|---|---|
| 8,425,289 B2* | 4/2013 | Beggs | A63F 13/53 463/43 |
| 9,858,832 B1* | 1/2018 | Hsu-Hoffman | A63F 13/803 |
| 10,625,676 B1* | 4/2020 | Tsimhoni | H04N 5/44504 |
| 10,720,079 B1* | 7/2020 | Hsu-Hoffman | A63F 13/90 |
| 10,984,657 B2* | 4/2021 | Galang | G07C 5/0841 |
| 11,273,844 B2* | 3/2022 | Kassner | G06Q 30/0265 |
| 11,504,622 B1* | 11/2022 | Sanchez | A63F 13/217 |
| 11,571,622 B2* | 2/2023 | Mehdi | A63F 13/28 |
| 2001/0035817 A1 | 11/2001 | Mizuta | |

(Continued)

FOREIGN PATENT DOCUMENTS

| | | |
|---|---|---|
| JP | H10-329580 A | 12/1998 |
| JP | 2001-219795 A | 8/2001 |

(Continued)

*Primary Examiner* — William H McCulloch, Jr.
(74) *Attorney, Agent, or Firm* — Dinsmore & Shohl LLP

(57) ABSTRACT

A processor is capable of assessing plural driving assessment items with mutually different details on the basis of driving operations of a vehicle. A game is displayed at a display part of an operation terminal by execution of a game application. The processor assigns modification factors generated in accordance with assessment results of the driving assessment items to a character in the game.

7 Claims, 16 Drawing Sheets

(56) References Cited

U.S. PATENT DOCUMENTS

| | | | |
|---|---|---|---|
| 2012/0053805 A1* | 3/2012 | Dantu | B60W 40/09 |
| | | | 701/70 |
| 2012/0215375 A1* | 8/2012 | Chang | B60W 50/08 |
| | | | 701/1 |
| 2012/0221216 A1* | 8/2012 | Chauncey | B60W 40/09 |
| | | | 701/1 |
| 2013/0316311 A1* | 11/2013 | England | G09B 19/167 |
| | | | 434/65 |
| 2018/0053433 A1* | 2/2018 | Dunn | G09B 7/00 |
| 2020/0184500 A1* | 6/2020 | Yuyama | B60W 40/09 |
| 2022/0047951 A1* | 2/2022 | Mehdi | A63F 13/803 |
| 2022/0185197 A1* | 6/2022 | Shimizu | A63F 13/211 |
| 2022/0288495 A1* | 9/2022 | Endo | A63F 13/65 |
| 2022/0289197 A1* | 9/2022 | Endo | A63F 13/58 |
| 2022/0292886 A1* | 9/2022 | Endo | B60K 35/00 |

FOREIGN PATENT DOCUMENTS

| | | |
|---|---|---|
| JP | 2011-063268 A | 3/2011 |
| JP | 2019-012481 A | 1/2019 |
| JP | 2020-095403 A | 6/2020 |

\* cited by examiner

| LOCK STATE | LOCK POINTS |
|---|---|
| UNLINKED LOCK STATE | 1 |
| FIRST LINKED LOCK STATE | 2 |
| SECOND LINKED LOCK STATE | 3 |

```
UNLINKED LOCK STATE·········1 POINT
FIRST LINKED LOCK STATE·······2 POINTS
   POINTS TOTAL            3 POINTS
```

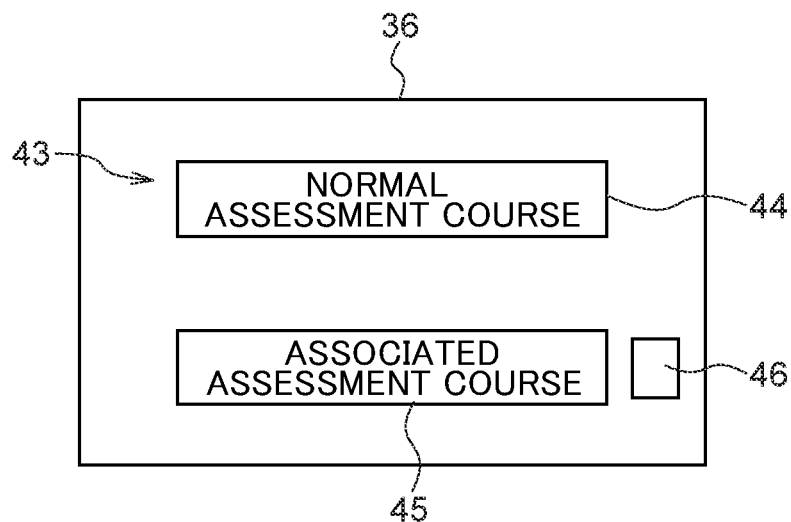
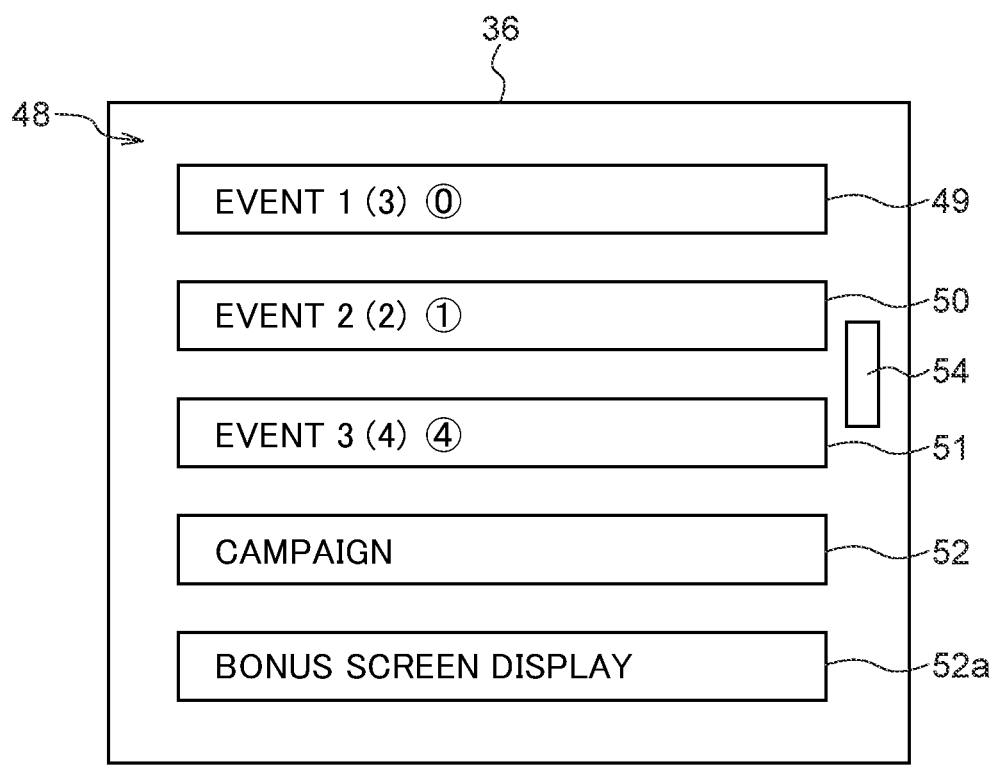

FIG.17

| FEATURE | MODIFICATION FACTOR |
|---|---|
| ATTACK | +AA POINTS (ACCELERATION AA POINTS) |
| DEFENSE | +BA POINTS (BRAKING BC POINTS) |
| BODY | +CC POINTS (STEERING CB POINTS) |
| MONEY | GAIN AA (BONUS ACTION 1) |
| WEAPON | GAIN XX (BONUS ACTION 2) |
| MAGIC | LEARN YY SPELL (EVENT 1) |
| MAGIC | LEARN ZZ SPELL (SPECIAL EVENT 2) |

FIG.18

| POINTS TOTAL OF LOCK POINTS | COEFFICIENT |
|---|---|
| 0 | 0 |
| 1 | 1 |
| 2 | 1.5 |
| 3 | 2 |
| 4 | 2.5 |

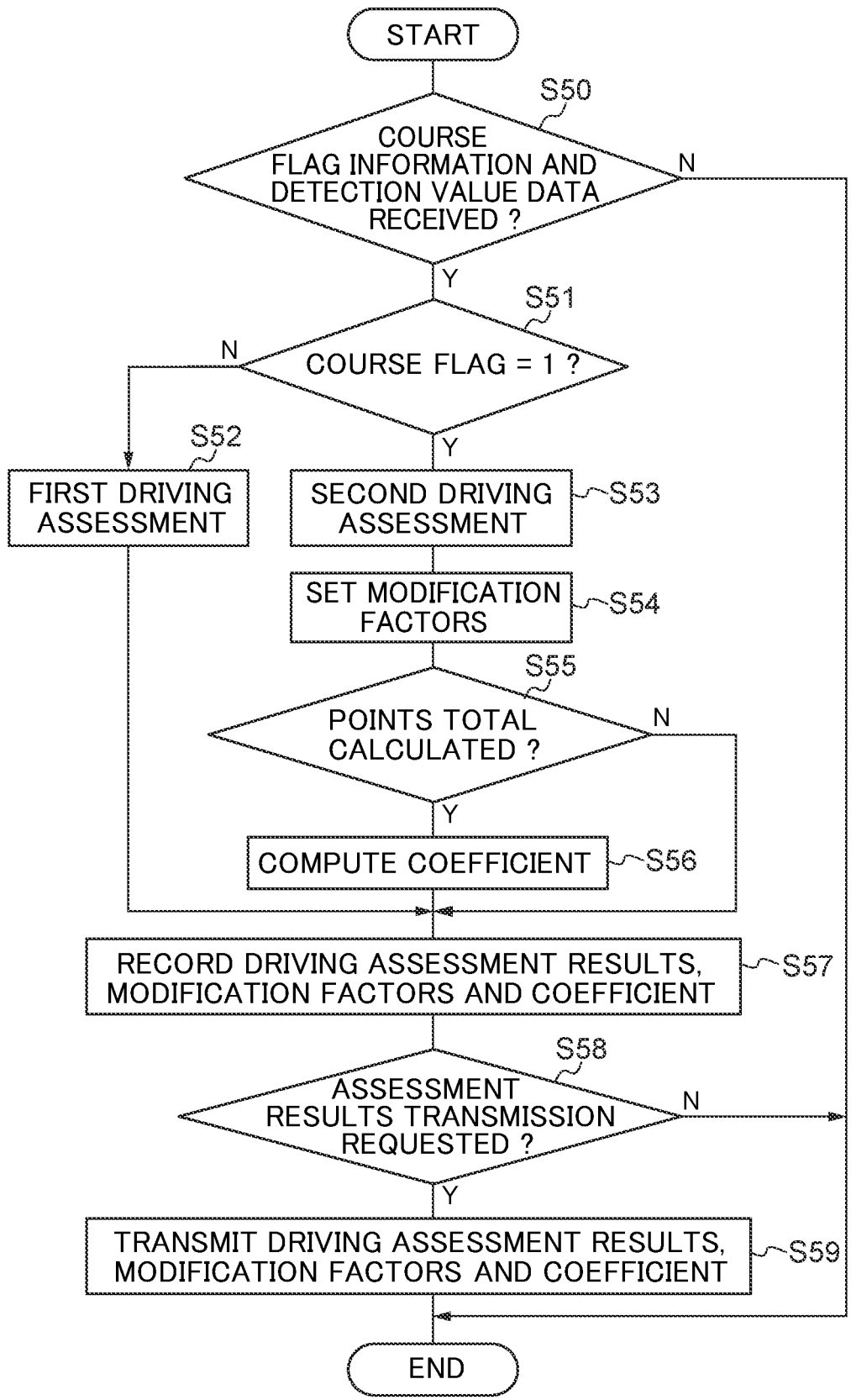

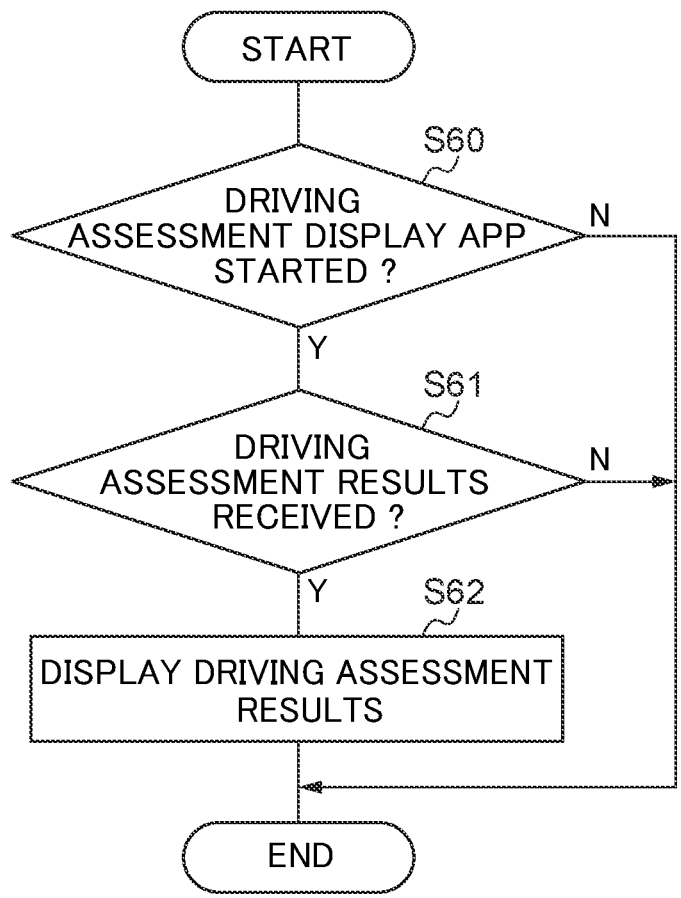

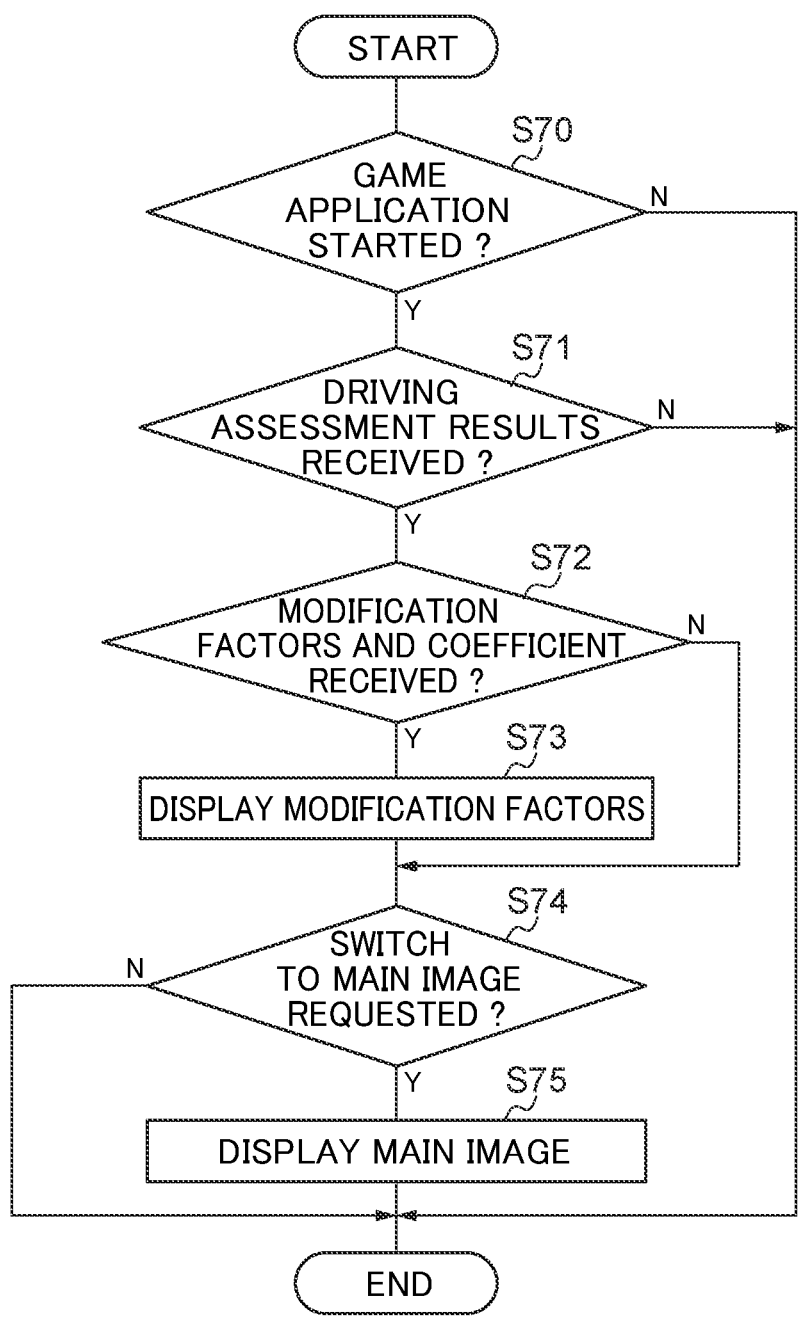

DRIVING ASSESSMENT DEVICE, DRIVING ASSESSMENT METHOD, AND NON-TRANSITORY RECORDING MEDIUM

CROSS-REFERENCE TO RELATED APPLICATION

This application is based on and claims priority under 35 USC 119 from Japanese Patent Application No. 2021-038777 filed on Mar. 10, 2021, the disclosure of which is incorporated by reference herein.

BACKGROUND

Technical Field

The present disclosure relates to a driving assessment device, a driving assessment method, and a non-transitory recording medium.

Related Art

Japanese Patent Application Laid-Open (JP-A) No. H10-329580 discloses a driving assessment device that cultivates an imaginary character displayed at a display part when a driver performs driving operations of a vehicle safely.

The driving assessment device according to JP-A No. H10-329580 has scope for improvement in regard to encouraging the driver to conduct driving operations such that a range of driving assessment items can be assessed.

In consideration of these circumstances, an object of the present disclosure is to provide a driving assessment device, a driving assessment method and a non-transitory recording medium that can encourage a driver to conduct driving operations such that a range of driving assessment items can be assessed.

SUMMARY

A driving assessment device according to a first aspect of the present disclosure includes a processor, the processor being configured to: assess plural driving assessment items with mutually different details based on driving operations of a vehicle; and assign a modification factor generated in accordance with an assessment result of the driving assessment items to a character in a game, the game being displayed at a display part of an operation terminal by execution of a game application.

The processor of the driving assessment device according to the first aspect of the present disclosure is capable of assessing plural driving assessment items with mutually different details based on driving operations of the vehicle. The game is displayed at the display part of the operation terminal by execution of the game application. The processor assigns modification factors generated in accordance with assessment results of the driving assessment items to the character in the game. Accordingly, when assessment results of the plural driving assessment items are obtained, plural modification factors with different details are assigned to the character of the game. Therefore, to provide various modifications to the character, the driver must conduct driving operations that correspond with various driving assessment items. Thus, the driver can be encouraged to conduct driving operations such that a range of driving assessment items are assessed.

In a driving assessment device according to a second aspect of the present disclosure, plural characters are selectable in the game, and the processor is configured to assign the modification factor to the selected plural characters.

According to the second aspect of the present disclosure, plural characters are selectable in the game. The processor is capable of assigning modification factors to the selected plural characters. Accordingly, in order to cultivate a different character after one character has been comprehensively cultivated, the driver must continue driving operations such that various driving assessment items are assessed. Thus, the driver may be encouraged to conduct driving operations such that a range of driving assessment items are assessed.

In a driving assessment device according to a third aspect of the present disclosure, the processor is configured to: compute a score relating to the driving assessment items based on the driving operations; and generate the modification factor in accordance with the score of the driving assessment items, and assign the generated modification factor to the character.

According to the third aspect of the present disclosure, the processor calculates a score relating to each driving assessment item based on driving operations. The processor generates modification factors according to the scores of the driving assessment items, and assigns the modification factors to the character. Thus, the driver may be encouraged to conduct driving operations so as to produce high scores for the driving assessment items.

In a driving assessment device according to a fourth aspect of the present disclosure, the processor is configured to: make a determination as to whether a predetermined bonus action has been conducted; and in a case in which the processor determines that the bonus action has been conducted, assign the modification factor to the character.

According to the fourth aspect of the present disclosure, in a case in which the processor determines that a predetermined bonus action has been conducted, the processor assigns a modification factor to the character. Thus, the driver may be encouraged to conduct the bonus action.

In a driving assessment device according to a fifth aspect of the present disclosure, according to the fourth aspect of the present disclosure, the bonus action is at least one of inspection or servicing of the vehicle, movement to a predetermined location, running at least a predetermined running distance, or making fuel consumption during running a predetermined value or less.

According to the fifth aspect of the present disclosure, the driver may be encouraged to take actions so as to conduct at least one of inspection and servicing of the vehicle, moving to a predetermined location, running for at least a predetermined running distance, or keeping fuel consumption during running to not more than a predetermined value.

A driving assessment method according to a sixth aspect of the present disclosure includes: a processor assessing plural driving assessment items with mutually different details based on driving operations of a vehicle; and the processor assigning a modification factor generated in accordance with an assessment result of the driving assessment items to a character in a game, the game being displayed at a display part of an operation terminal by execution of a game application.

As described above, a driving assessment device, driving assessment method and non-transitory recording medium according to the present disclosure provide an effect of enabling encouraging of a driver to conduct driving operations such that a range of driving assessment items can be assessed.

BRIEF DESCRIPTION OF THE DRAWINGS

Exemplary embodiments of the present disclosure will be described in detail based on the following figures, wherein:

FIG. 11 is a view showing the display part displaying a course selection screen.

FIG. 12 is a view showing the display part displaying an event selection screen.

FIG. 17 is a view showing the display part of the portable terminal displaying modification factors.

FIG. 18 is a diagram showing a coefficient map.

FIG. 22 is a flowchart showing processing that is executed by the driving assessment device.

FIG. 23 is a flowchart showing processing that is executed by the portable terminal.

FIG. 24 is a flowchart showing other processing that is executed by the portable terminal.

DESCRIPTION OF EMBODIMENTS

Below, an exemplary embodiment of a driving assessment device 10, a driving assessment method and a non-transitory recording medium according to the present disclosure is described with reference to the drawings.

Figure 1:
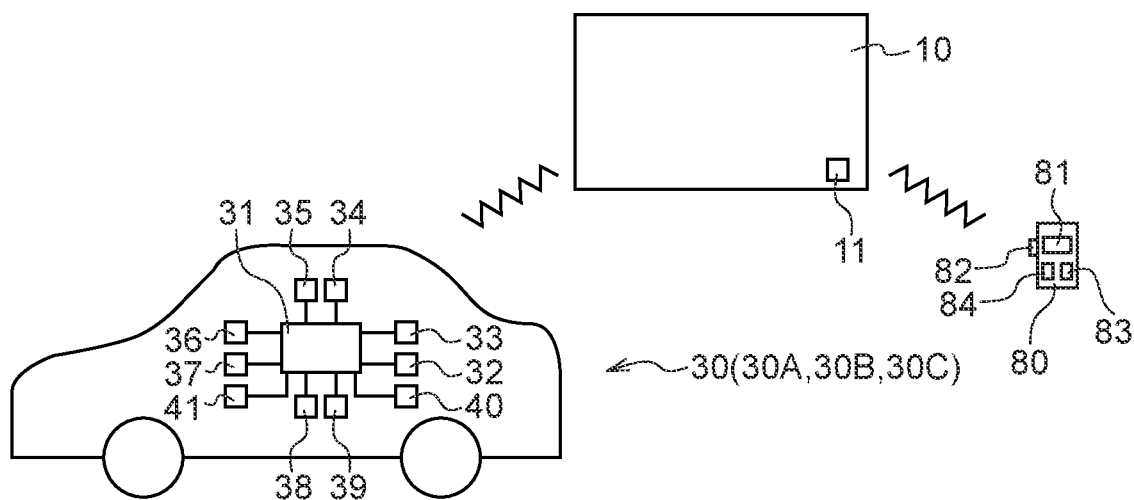
FIG. 1 is a diagram showing a driving assessment device according to an exemplary embodiment, a vehicle and a portable terminal.

A vehicle 30 is capable of data communications via a network with a transmission/reception section 11 (an assessment results acquisition section) of the driving assessment device 10. As shown in FIG. 1, the vehicle 30 includes an electronic control unit (ECU) 31, a wheel speed sensor 32 (a detection section), an accelerator position sensor 33 (a detection section), a steering angle sensor 34 (a detection section), an ignition switch 35, a display part 36 (an event display section), a global positioning system (GPS) receiver 37 (a detection section), a first wireless communications device 38, a second wireless communications device 39, a shift lever position sensor 40 (a detection section), a brake pedal force sensor 41 (a detection section), and other detection sections (not shown in the drawings).

A vehicle ID is assigned to the vehicle 30, which is capable of receiving assessments from the driving assessment device 10. There are three types of the vehicle 30 according to the present exemplary embodiment. That is, vehicles may be a type 1 vehicle 30A, a type 2 vehicle 30B and a type 3 vehicle 30C. Where there is no need to distinguish between the type 1 vehicle 30A, type 2 vehicle 30B and type 3 vehicle 30C in the descriptions below, these vehicles in general are referred to as the vehicle 30. The type 2 vehicle 30B includes a first linked lock function, which is described below. The type 3 vehicle 30C includes a second linked lock function, which is described below. The type 1 vehicle 30A does not include the first linked lock function or the second linked lock function. The wheel speed sensor 32, accelerator position sensor 33, steering angle sensor 34, ignition switch 35, display part 36, GPS receiver 37, first wireless communications device 38, second wireless communications device 39, shift lever position sensor 40, brake pedal force sensor 41 and the other detection sections of the vehicle 30 are connected to the ECU 31. The ECU 31 includes a CPU, ROM, RAM, storage, a communications interface and an input/output interface. The network mentioned above includes communication networks of telecommunication carriers and Internet networks.

Figure 2:
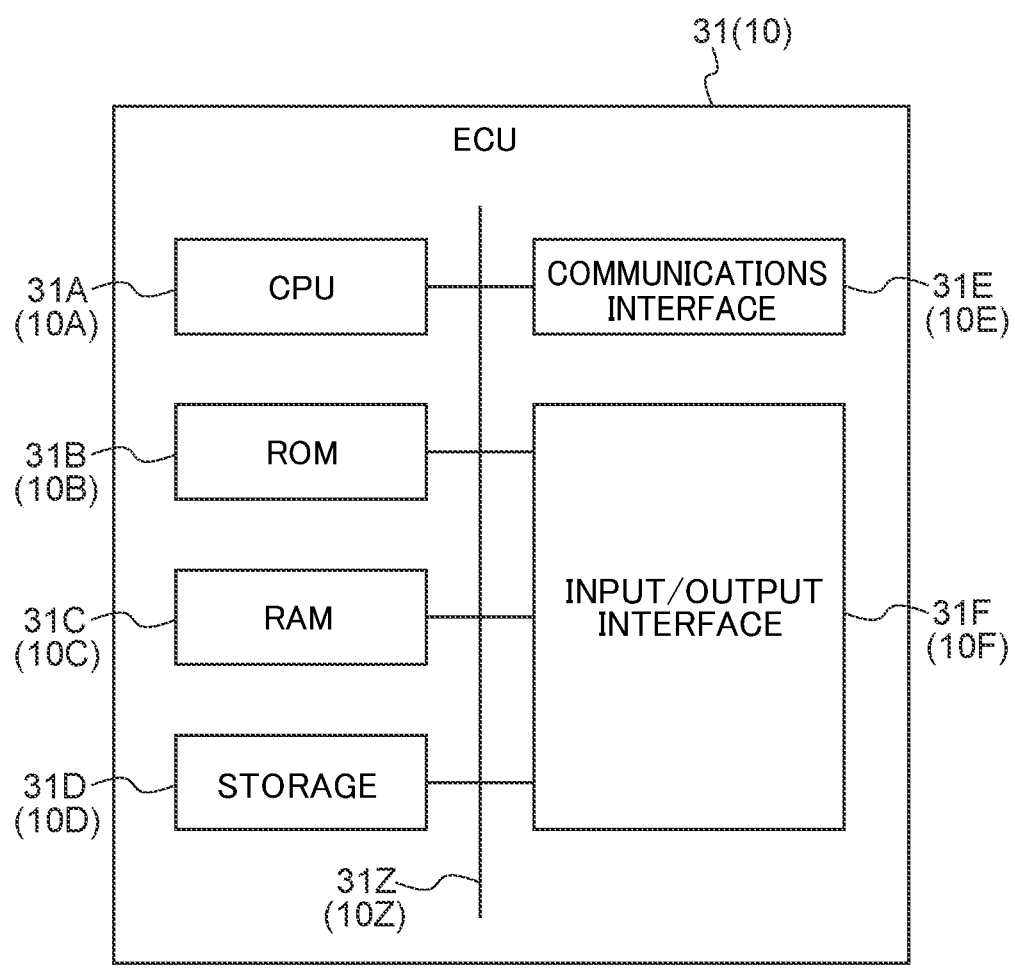
FIG. 2 is a control block diagram of an ECU of the vehicle shown in FIG. 1 and the driving assessment device.
Figure 8:
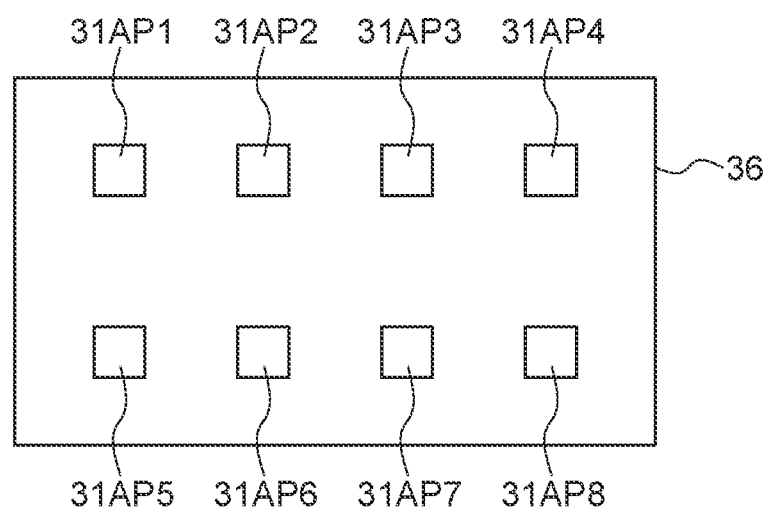
FIG. 8 is a view showing an initial screen of a display part installed in the vehicle.

As shown in FIG. 2, the ECU 31 includes a central processing unit (CPU, which is a processor) 31A, read-only memory (ROM) 31B, random access memory (RAM) 31C, storage 31D, a communications interface (I/F) 31E, and an input/output interface 31F. The CPU 31A, ROM 31B, RAM 31C, storage 31D, communications interface 31E and input/output interface 31F are connected with one another to be capable of communications via a bus 31Z. The ECU 31 is capable of acquiring information of dates and times from a timer (not shown in the drawings). As illustrated in FIG. 8, plural applications (programs) 31AP1, 31AP2, 31AP3, 31AP8 are installed at the ECU 31. The application 31AP1 is a lock application, and the application 31AP2 is a driving assessment application.

The CPU 31A is a central arithmetic processing unit that executes various programs and controls respective parts. That is, the CPU 31A reads a program from the ROM 31B or the storage 31D and executes the program, using the RAM 31C as a work area. The CPU 31A controls configurations and performs various kinds of computation processing (information processing) in accordance with programs recorded in the ROM 31B or storage 31D.

The ROM 31B stores various programs and various kinds of data. The RAM 31C serves as a work area and temporarily memorizes programs and data. The storage 31D is structured with a memory device such as a hard disk drive (HDD), a solid state drive (SSD) or the like. The storage 31D stores various programs and various kinds of data. The communications interface 31E is an interface for the ECU 31 to communicate with other equipment. The input/output interface 31F is an interface for communicating with various devices.

The wheel speed sensor 32, accelerator position sensor 33, steering angle sensor 34, GPS receiver 37, shift lever position sensor 40, brake pedal force sensor 41 and the other detection sections repeatedly detect, each time a predetermined interval passes, a physical quantity that changes in accordance with at least one of running, steering and braking of the vehicle 30 or a physical quantity that is changed by a predetermined operation member (for example, a shift lever) being operated. Four of the wheel speed sensor 32 are provided at the vehicle 30. The wheel speed sensors 32 respectively detect wheel speeds of four wheels of the vehicle 30. The accelerator position sensor 33 detects accelerator positions. The steering angle sensor 34 detects steering angles of a steering wheel. The GPS receiver 37 receives GPS signals transmitted from GPS satellites and thus acquires information relating to positions at which the vehicle 30 is running (below referred to as position information). The shift lever position sensor 40 detects positions of a shift lever (not shown in the drawings). The brake pedal force sensor 41 detects brake pedal forces that a driver applies to a brake pedal (not shown in the drawings). The other detection sections detect, for example running distances, fuel consumption and the like of the vehicle 30. Detection values detected by the wheel speed sensors 32, accelerator position sensor 33, steering angle sensor 34, GPS receiver 37, shift lever position sensor 40, brake pedal force sensor 41 and the other detection sections are sent to the ECU 31 via a Controller Area Network (CAN) provided in the vehicle 30, and are stored in the storage 31D of the ECU 31.

The display part 36 (a touch panel) is capable of displaying various images (and moving images). The display part 36 is provided at, for example, an instrument panel. The first wireless communications device 38 and a portable terminal (an operation terminal) 80, which is described below, perform data communications via the network with each other. The second wireless communications device 39 performs short-range wireless communications with the portable terminal 80, which is located in a cabin of the vehicle 30. For example, the second wireless communications device 39 can use Bluetooth (registered trademark) to conduct short-range wireless communications with a second transmission/reception section 84 of the portable terminal 80.

Figure 3:
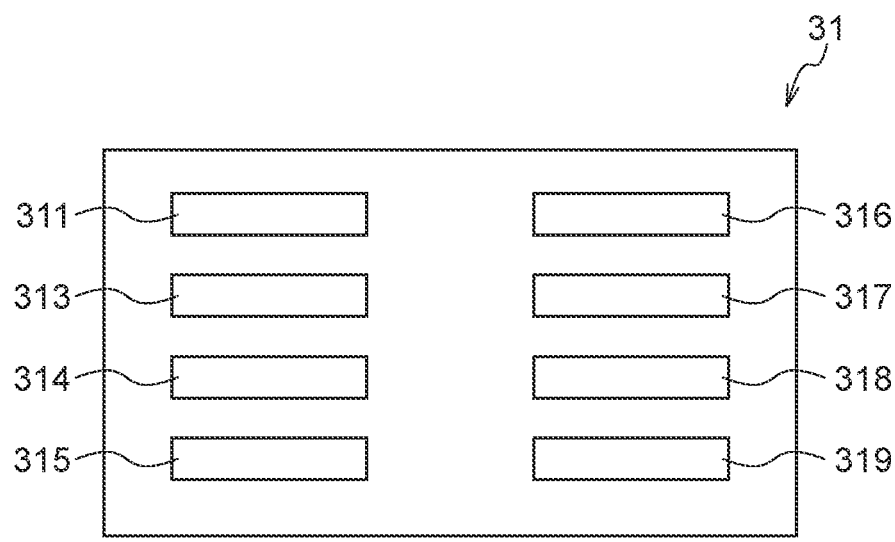
FIG. 3 is a functional block diagram of an ECU installed in a type 1 vehicle.
Figure 4:
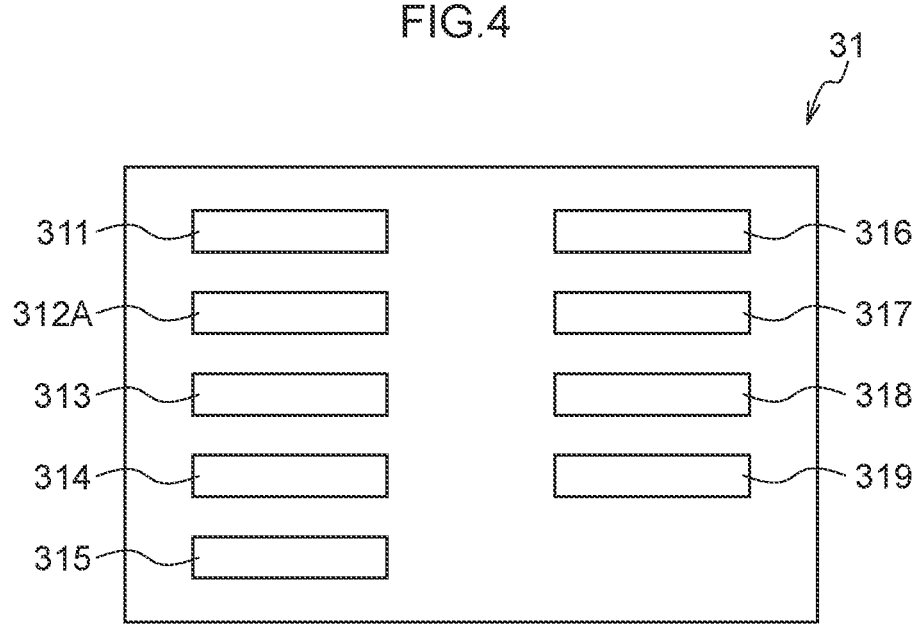
FIG. 4 is a functional block diagram of an ECU installed in a type 2 vehicle.
Figure 5:
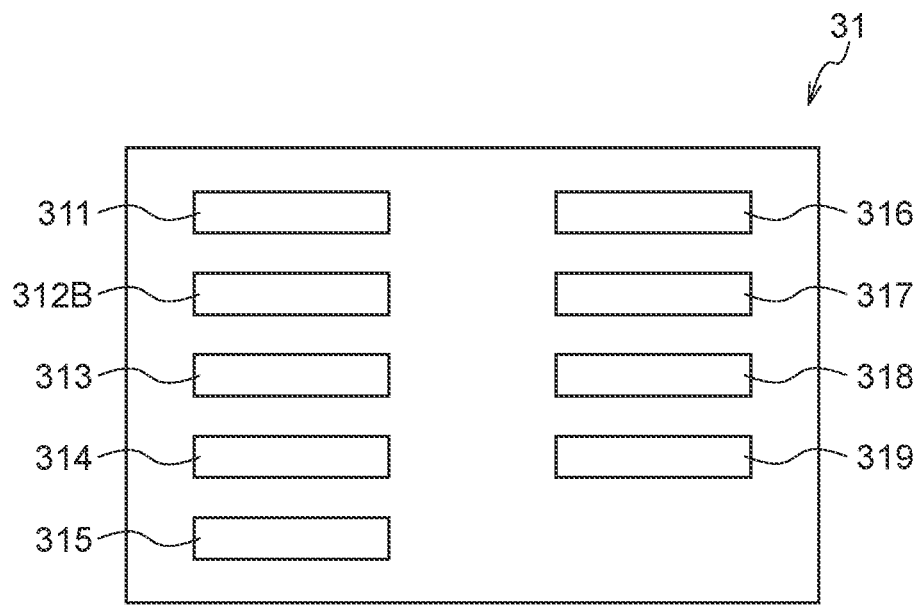
FIG. 5 is a functional block diagram of an ECU installed in a type 3 vehicle.

Examples of functional structures of the ECU 31 of the vehicle 30 are shown by block diagrams in FIG. 3 to FIG. 5. As functional structures, the ECU 31 includes an association determination section 311, a lock determination section 313, a level determination section 314, a running detection section 315, an ignition detection section 316, an event specification section 317, a designation section 318 and a determination prohibition section 319. The ECU 31 of the type 2 vehicle 30B, which is illustrated in FIG. 4, also includes a specification section 312A. The ECU 31 of the type 3 vehicle 30C, which is illustrated in FIG. 5, also includes a specification section 312B. The association determination section 311, specification section 312A, specification section 312B, lock determination section 313, level determination section 314, running detection section 315, ignition detection section 316, event specification section 317, designation section 318 and determination prohibition section 319 are realized by the CPU of the ECU 31 reading and executing a program memorized in the ROM. Functions of the association determination section 311, specification section 312A, specification section 312B, lock determination section 313, level determination section 314, running detection section 315, ignition detection section 316, event specification section 317, designation section 318 and determination prohibition section 319 are described below.

Detection value data, which is data representing the detection values detected by the wheel speed sensor 32, accelerator position sensor 33, steering angle sensor 34, GPS receiver 37, shift lever position sensor 40, brake pedal force sensor 41 and the other detection sections of the vehicle 30, is sequentially recorded at the storage 31D. As described below, when the ignition switch 35 is switched from an on position to an off position, all the detection value data which was recorded at the storage 31D while the ignition switch 35 was at the on position is transmitted from the first wireless communications device 38 through the network to the driving assessment device 10 (the transmission/reception section 11), and is recorded at storage of the driving assessment device 10. All the detection value data recorded at the storage of the driving assessment device 10 includes information relating to the vehicle ID, information relating to times of acquisition, and position information acquired by the GPS receiver 37.

The driving assessment device 10 and portable terminal 80 shown in FIG. 1 are capable of connecting to the network. The driving assessment device 10 is administered by an organization "A", who is the manufacturer that produced the vehicle 30. As shown in FIG. 2, similarly to the ECU 31, the driving assessment device 10 includes a CPU (processor) 10A, ROM 10B that serves as a non-transitory recording medium (memory medium), RAM 10C that serves as a non-transitory recording medium (memory medium), storage 10D that serves as a non-transitory recording medium (memory medium), a communications interface 10E and an input/output interface 10F. The CPU 10A, ROM 10B, RAM 10C, storage 10D, communications interface 10E and input/output interface 10F are connected with one another to be capable of communications via a bus 10Z. The driving assessment device 10 and the portable terminal 80 are capable of acquiring information of dates and times from timers (not shown in the drawings).

Figure 6:
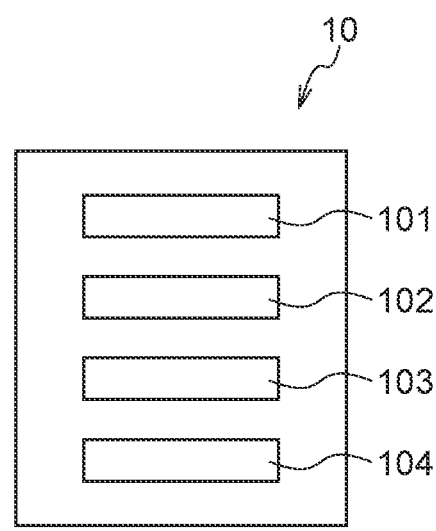
FIG. 6 is a functional block diagram of the driving assessment device shown in FIG. 1.

FIG. 6 is a block diagram showing an example of functional structures of the driving assessment device 10. As functional structures, the driving assessment device 10 includes an assessment section (a bonus determination section) 101, an event determination section 102, a modification factor assignment section 103 and a transmission/reception control section 104. The assessment section 101, event determination section 102, modification factor assignment section 103 and transmission/reception control section 104 are realized by the CPU 10A reading and executing a program memorized in the ROM 10B. Functions of the assessment section 101, event determination section 102, modification factor assignment section 103 and transmission/reception control section 104 are described below.

The portable terminal 80 shown in FIG. 1 is provided with a display part 81 including a touch panel. The display part 81 is connected to an input/output interface of the portable terminal 80. The portable terminal 80 is further provided with a lock switch 82, and the portable terminal 80 includes a first transmission/reception section 83 and the second transmission/reception section 84.

Figure 7:
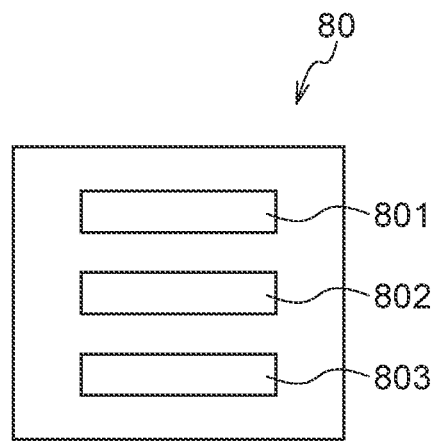
FIG. 7 is a functional block diagram of the portable terminal shown in FIG. 1.

FIG. 7 is a block diagram showing an example of functional structures of the portable terminal 80. As functional structures, the portable terminal 80 includes a first transmission/reception control section 801, a second transmission/reception control section 802 and a display part control section 803. The first transmission/reception control section 801, second transmission/reception control section 802 and display part control section 803 are realized by a CPU reading and executing a program memorized in ROM. The portable terminal 80 is in the possession of, for example, a driver of the vehicle 30 to which the vehicle ID is assigned. A predetermined driving assessment display application and a game application are installed at the portable terminal 80.

The display part control section 803 controls the display part 81. That is, the display part control section 803 displays at the display part 81, for example, information received from the transmission/reception section 11 by the first transmission/reception section 83 under the control of the first transmission/reception control section 801, information received from the second wireless communications device 39 by the second transmission/reception section 84 under the control of the second transmission/reception control section 802, and information entered via the display part 81 (the touch panel). Information entered by the display part 81 (the touch panel) can be transmitted by the first transmission/reception section 83 to the transmission/reception section 11 under the control of the transmission/reception control section 104 and can be transmitted by the second transmission/reception section 84 to the second wireless communications device 39.

Operation and Effects

Now, operation and effects of the present exemplary embodiment are described.

Figure 20:
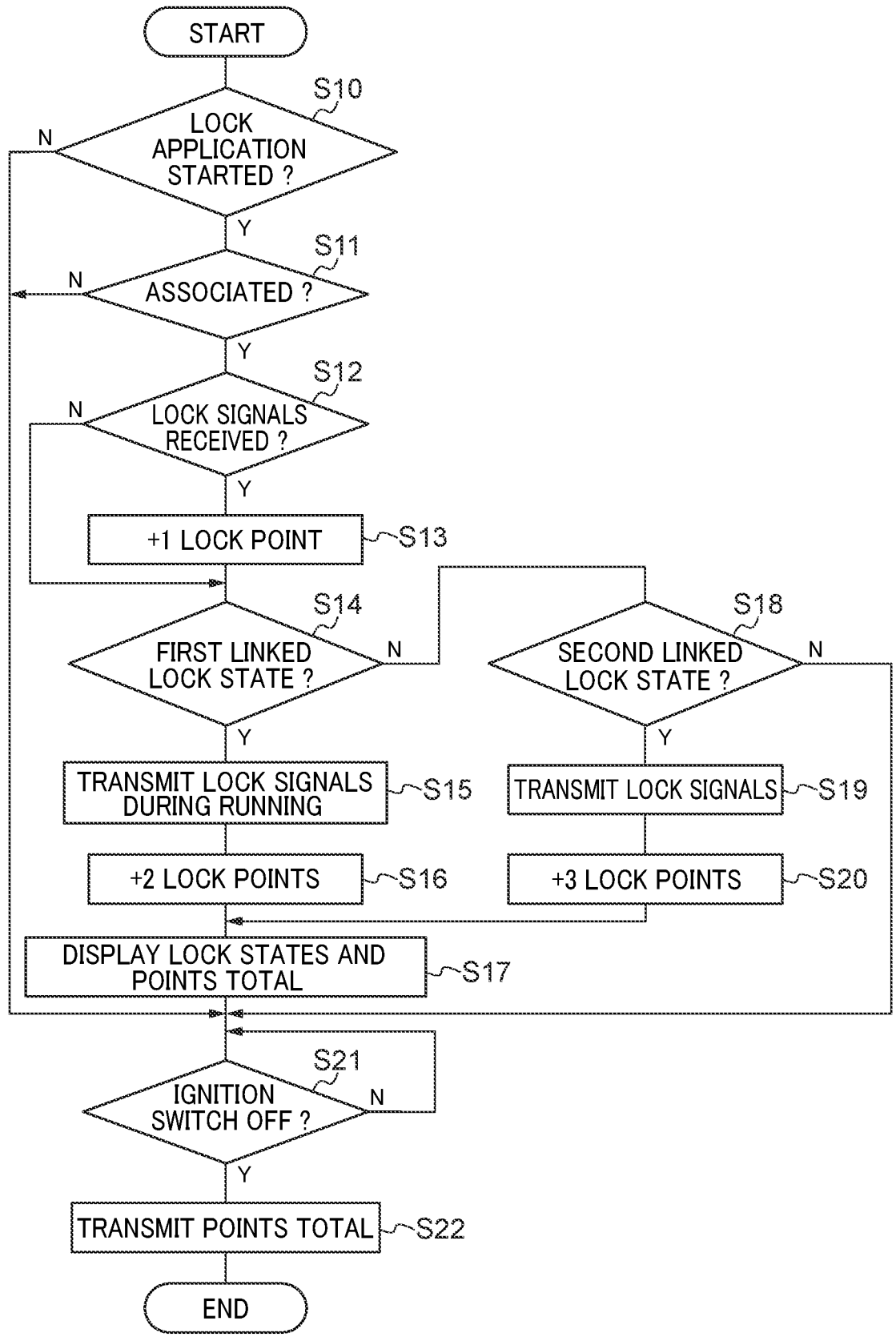
FIG. 20 is a flowchart showing processing that is executed by the ECU.

First, a flow of processing carried out by the ECU 31 of the vehicle 30 is described using the flowchart in FIG. 20. When the ignition detection section 316 detects switching of the ignition switch 35 from the off position to the on position, the ECU 31 executes the processing of the flowchart in FIG. 20 repeatedly, each time a predetermined interval passes.

In step S10, the association determination section 311 makes a determination as to whether the lock application 31AP1 has been started. The lock application 31AP1 is started up when a vehicle occupant touches the lock application 31AP1 shown in FIG. 8 (the display part 36) with a hand.

When the result of the determination in step S10 is Yes, the ECU 31 proceeds to step S11, and the association determination section 311 makes a determination as to whether the portable terminal 80 located in the cabin of the vehicle 30 has an association with the vehicle 30. More specifically, the association determination section 311 makes a determination as to whether ID information of the portable terminal 80 that is included in wireless signals transmitted from the second transmission/reception section 84 of the portable terminal 80 to the second wireless communications device 39 matches ID information of the vehicle 30.

When the result of the determination in step S11 is Yes, the ECU 31 proceeds to step S12 and makes a determination as to whether lock signals are included in the wireless signals transmitted from the second transmission/reception section 84 to the second wireless communications device 39. When the lock switch 82 provided at the portable terminal 80 has been moved from an off position to an on position, the portable terminal 80 is in an unlinked lock state in which all operations are prohibited apart from moving the lock switch 82 to the off position. The unlinked lock state is a lock state based only on functions of the portable terminal 80. When the portable terminal 80 is in the unlinked lock state, lock signals are included in the wireless signals mentioned above.

Figure 9:
FIG. 9 is a diagram showing types of lock and lock points.

When the result of the determination in step S12 is Yes, the ECU 31 proceeds to step S13, and the lock determination section 313 determines that the portable terminal 80 is in the unlinked lock state. In addition, the level determination section 314 refers to a lock determination map 42 illustrated in FIG. 9, determines that a lock points value for the unlinked lock state is 1, and sets lock points to 1. The lock determination map 42 specifies lock points for the unlinked lock state, a first linked lock state and a second linked lock state. The stronger the lock state, the greater the specified number of lock points. As can be seen from the lock determination map 42, the unlinked lock state has the weakest strength level of the three lock states.

When the result of the determination in step S12 is No or the processing of step S13 is complete, the ECU 31 proceeds to step S14. In step S14, the lock determination section 313 makes a determination as to whether the vehicle 30 includes the first linked lock function. As mentioned above, the type 2 vehicle 30B includes the first linked lock function, which is a lock function based on functions of the type 2 vehicle 30B. Therefore, when the vehicle 30 in which the ECU 31 is installed is the type 2 vehicle 30B, the result of the determination in step S14 is Yes. The first linked lock function referred to here is a function in which the second wireless communications device 39 transmits first linked lock signals generated by the specification section 312A to the second transmission/reception section 84 when the running detection section 315 of the ECU 31 determines, on the basis of information sent from the wheel speed sensors 32, that the type 2 vehicle 30B is running.

When the result of the determination in step S14 is Yes, the ECU 31 proceeds to step S15. When the ECU 31 of the type 2 vehicle 30B has proceeded to step S15 and the type 2 vehicle 30B is in a running state, the second wireless communications device 39 of the type 2 vehicle 30B transmits the first linked lock signals to the second transmission/reception section 84 continuously. The portable terminal 80 receiving the first linked lock signals goes into the first linked lock state. The portable terminal 80 in the first linked lock state prohibits all operations apart from moving the lock switch 82 to the off position. Hence, while the type 2 vehicle 30B is running, all operations of the portable terminal 80 are prohibited even if the lock switch 82 is moved to the off position.

When the processing of step S15 is complete, the ECU 31 proceeds to step S16, and the level determination section 314 refers to the lock determination map 42. Accordingly, the level determination section 314 determines that the lock points value for the first linked lock state is 2, and adds 2 to the lock points.

Figure 10:
FIG. 10 is a view showing the display part displaying lock states and a points total.

When the processing of step S16 is complete, the ECU 31 proceeds to step S17 and the level determination section 314 calculates the points total of the lock points. Supposing that the result of the determination in step S12 is Yes, the points total is 3. As illustrated in FIG. 10, in step S17 the display part 36 displays all current lock states (the unlinked lock state and the first linked lock state), the lock points of each lock state, and the points total of the lock points.

On the other hand, when the result of the determination in step S14 is No, the ECU 31 proceeds to step S18. If the vehicle 30 in which the ECU 31 is installed is the type 3 vehicle 30C, the result of a determination in step S18 is Yes and the ECU 31 proceeds to step S19. As mentioned above, the type 3 vehicle 30C includes the second linked lock function, which is a lock function based on functions of the type 3 vehicle 30C. The second linked lock function referred to here is a function in which the second wireless communications device 39 transmits second linked lock signals generated by the specification section 312B to the second transmission/reception section 84 when the ignition detection section 316 of the ECU 31 determines that the ignition switch 35 is at the on position. When the ECU 31 of the type 3 vehicle 30C has proceeded to step S19 and the ignition switch 35 is at the on position, the second wireless communications device 39 of the type 3 vehicle 30C transmits the second linked lock signals to the second transmission/reception section 84 continuously. The portable terminal 80 receiving the second linked lock signals goes into the second linked lock state. The portable terminal 80 in the second linked lock state prohibits all operations apart from moving the lock switch 82 to the off position. Hence, while the ignition switch 35 is at the on position, all operations of the portable terminal 80 are prohibited even if the lock switch 82 is moved to the off position.

When the processing of step S19 is complete, the ECU 31 proceeds to step S20, and the level determination section 314 refers to the lock determination map 42. Accordingly, the level determination section 314 determines that the lock points value for the second linked lock state is 3, and adds 3 to the lock points.

When the processing of step S20 is complete, the ECU 31 proceeds to step S17 and the level determination section 314 calculates the points total of the lock points. Supposing that the result of the determination in step S12 is Yes, the points total is 4. In step S17 the display part 36 displays all current lock states (the unlinked lock state and the second linked lock state), the lock points of each lock state, and the points total of the lock points.

When the result of the determination in step S10, S11 or S18 is No or the processing of step S17 is complete, the ECU 31 proceeds to step S21 and the ignition detection section 316 makes a determination as to whether the ignition switch 35 has been switched to the off position. When the result of the determination in step S21 is Yes, the ECU 31 proceeds to step S22 and the first wireless communications device 38 transmits information relating to the points total to the transmission/reception section 11 of the driving assessment device 10.

When the processing of step S22 is complete, the ECU 31 temporarily ends the processing of the flowchart in FIG. 20.

Figure 21:
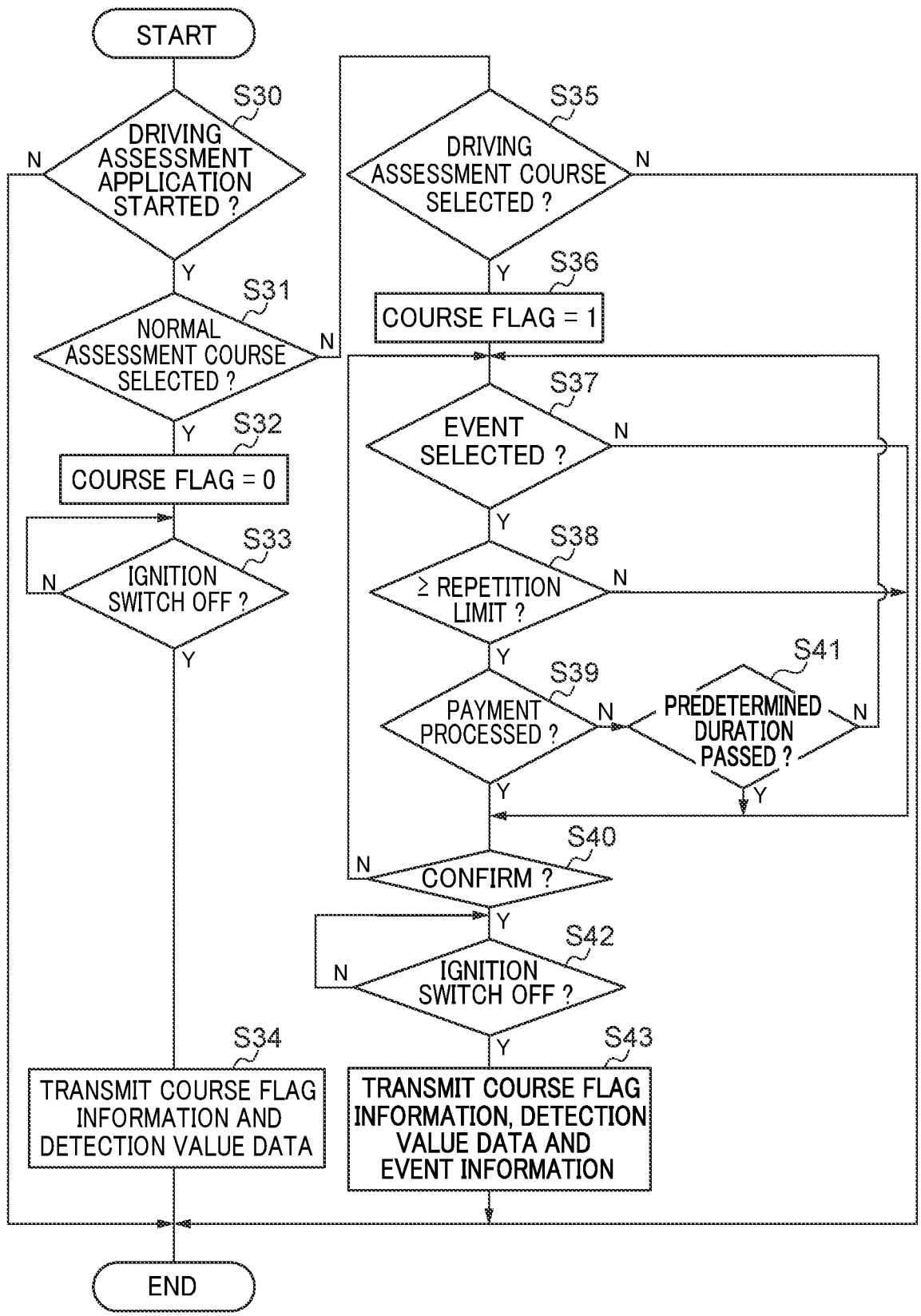
FIG. 21 is a flowchart showing other processing that is executed by the ECU.

Now, another flow of processing carried out by the ECU 31 of the vehicle 30 is described using the flowchart in FIG. 21. When the ignition detection section 316 detects switching of the ignition switch 35 from the off position to the on position, the ECU 31 executes the processing of the flowchart in FIG. 21 repeatedly, each time a predetermined interval passes.

In step S30, the association determination section 311 makes a determination as to whether the driving assessment application 31AP2 has been started. The driving assessment application 31AP2 is started up when a vehicle occupant touches the driving assessment application 31AP2 shown in FIG. 8 (the display part 36) with a hand. When the lock application 31AP2 is started up, the display part 36 displays a course selection screen 43 illustrated in FIG. 11. The course selection screen 43 includes a first selection area 44 and a second selection area 45.

When the result of the determination in step S30 is Yes, the ECU 31 proceeds to step S31 and the designation section 318 makes a determination as to whether the first selection area 44 is selected. That is, the designation section 318 makes a determination as to whether the vehicle occupant has touched the first selection area 44 with a hand.

When the result of the determination in step S31 is Yes, the ECU 31 proceeds to step S32 and the designation section 318 sets a course flag to zero. The default value of the course flag is zero.

When the processing of step S32 is complete, the ECU 31 proceeds to step S33, and the ignition detection section 316 makes a determination as to whether the ignition switch 35 has been switched to the off position.

When the result of the determination in step S33 is Yes, the ECU 31 proceeds to step S34, and the first wireless communications device 38 transmits course flag information and all the detection value data which was recorded at the storage 31D while the ignition switch 35 was at the on position to the transmission/reception section 11 of the driving assessment device 10.

On the other hand, when the result of the determination in step S31 is No, the ECU 31 proceeds to step S35 and the designation section 318 makes a determination as to whether the second selection area 45 is selected. That is, the designation section 318 makes a determination as to whether the vehicle occupant has touched the second selection area 45 with a hand.

When the result of the determination in step S35 is Yes, the ECU 31 proceeds to step S36 and the designation section 318 sets the course flag to one.

When the processing of step S36 is complete, the ECU 31 proceeds to step S37 and the display part 36 displays an event selection screen 48, which is illustrated in FIG. 12. The event selection screen 48 includes an event 1 selection area 49, an event 2 selection area 50, an event 3 selection area 51, a campaign selection area 52, a bonus screen selection area 52a, and a back selection area 54.

When the vehicle occupant touches any of the event 1 selection area 49, the event 2 selection area 50 and the event 3 selection area 51 with a hand, one of the events 1 to 3 is selected. The event is conducted in accordance with driving of the vehicle 30 while the vehicle 30 is running from the current position to a predetermined destination. For example, movements (operations) of the vehicle 30, actions of the vehicle occupant and the like are included in the event. Details of the events 1 to 3 are shown below. In the descriptions below, the details of each event may be referred to as event information. The event information of the corresponding event 1 to 3 is displayed at the display part 36 (but is not shown in FIG. 12) when the vehicle occupant touches any of the event 1 selection area 49, the event 2 selection area 50 and the event 3 selection area 51.

Event 1 (event information 1): Keep activation of a pre-crash safety system (PCS) to no more than one occasion (time)

Event 2 (event information 2): Keep abrupt steering to no more than three occasions Event 3 (event information 3): Keep sudden starts to no more than five occasions When the vehicle occupant touches the back selection area 54, the display part 36 displays the course selection screen 43 again.

Figure 15:
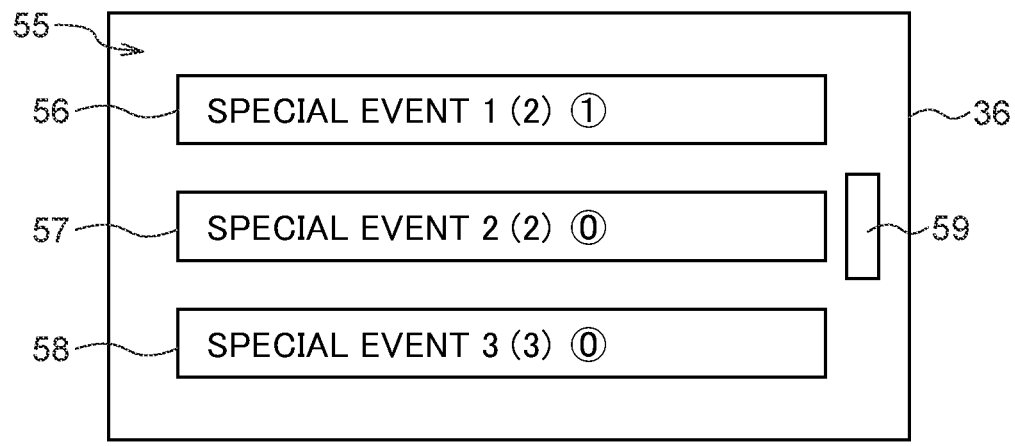
FIG. 15 is a view showing the display part displaying a campaign selection screen.

When the display part 36 displays the event selection screen 48 and the vehicle occupant touches the campaign selection area 52 with a hand, the display part 36 displays a campaign selection screen 55, which is illustrated in FIG. 15. The campaign selection screen 55 includes a special event 1 selection area 56, a special event 2 selection area 57, a special event 3 selection area 58 and a back selection area 59.

When the vehicle occupant touches any of the special event 1 selection area 56, the special event 2 selection area 57 and the special event 3 selection area 58 with a hand, one of the special events 1 to 3 is selected. Details of the special events 1 to 3 are shown below. In the descriptions below, the details of each special event may be referred to as event information. The event information of the corresponding special event 1 to 3 is displayed at the display part 36 (but is not shown in FIG. 15) when the vehicle occupant touches any of the special event 1 selection area 56, the special event 2 selection area 57 and the special event 3 selection area 58. The special events are a type of event to be conducted only in a predetermined period. The predetermined period is, for example, one month.

Special event 1 (event information 4): Keep sudden braking to no more than three occasions Special event 2 (event information 5): Keep reversing to no more than three occasions Special event 3 (event information 6): Keep U turns to no more than one occasion When one of the events (or special events) is selected by the vehicle occupant in step S37, the ECU 31 proceeds to step S38. The numbers written in parentheses in FIG. 12 and FIG. 15 are repetition limits of each event (or special event). The numbers written within circles in FIG. 12 and FIG. 15 are repetition counts of the number of times each event has been conducted by the vehicle occupant of the vehicle 30 until the current time. In step S38, the determination prohibition section 319 makes a determination as to whether the repetition count of the event (or special event) selected in step S37 is at least the repetition limit thereof, which is a predetermined plural number.

When the result of the determination in step S38 is Yes, the ECU 31 proceeds to step S39 and makes a determination, for the event (or special event) whose repetition count is at least the repetition limit, as to whether predetermined payment processing has been carried out subsequent to the repetition count reaching the repetition limit. The payment processing can be conducted with, for example, electronic money. When a payment is made, a payment server (not shown in the drawings) that is capable of communications with the driving assessment device 10 and the vehicle 30 via the Internet executes the payment processing. When the payment processing is executed, information is transmitted from the payment server to the ECU 31 of the vehicle 30 and is recorded in the storage 31D. Accordingly, the determination prohibition section 319 refers to the storage 31D to make the determination as to whether payment processing for the selected event (or special event) has been carried out.

When the result of the determination in step S39 is Yes, the ECU 31 proceeds to step S40 and makes a determination as to whether a confirm switch area 46 included in the course selection screen 43 has been touched by the vehicle occupant. When the display part 36 displays the event selection screen 48 and the back selection area 54 is touched, the display part 36 displays the course selection screen 43 again. When the display part 36 displays the campaign selection screen 55 and the back selection area 59 is touched, the display part 36 displays the course selection screen 43 again.

When, for example, the event 1 is selected in step S37 and the confirm switch area 46 is touched, then in step S40 the ECU 31 confirms that only the event 1 is selected. Alternatively, when the result of the determination in step S40 is No, the ECU 31 repeats the processing from step S37. Therefore, a vehicle occupant can select plural events (and special events) from the events 1 to 3 and the special events 1 to 3.

Figure 13:
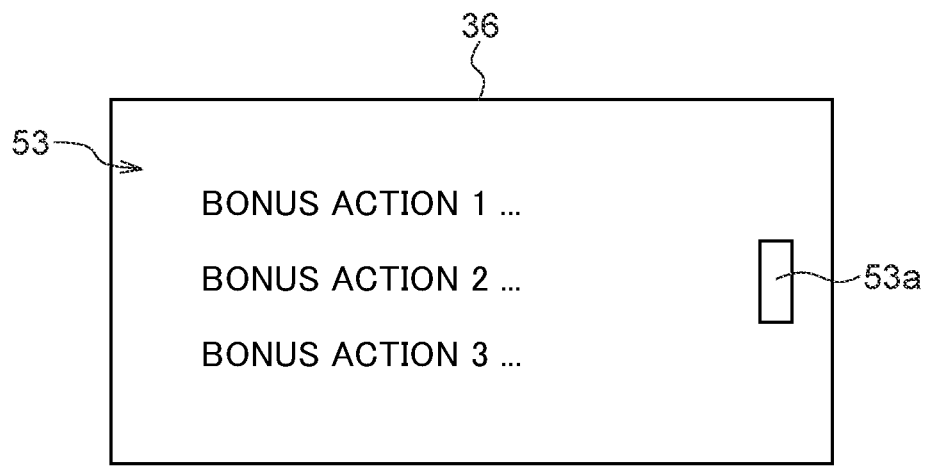
FIG. 13 is a view showing the display part displaying a bonus screen.

When the display part 36 displays the event selection screen 48 and the vehicle occupant touches the bonus screen selection area 52a, a bonus screen 53 illustrated in FIG. 13 is displayed at the display part 36. As shown in FIG. 13, the bonus screen 53 displays three bonus actions. Details of the bonus actions are shown below.

Bonus action 1: Conduct at least one of inspection or servicing of the vehicle

Bonus action 2: Visit an "A" store

Bonus action 3: Run at least a predetermined running distance and keep fuel consumption to no more than a predetermined value When the vehicle occupant touches a back selection area 53a, the display part 36 displays the course selection screen 43 again.

Figure 14:
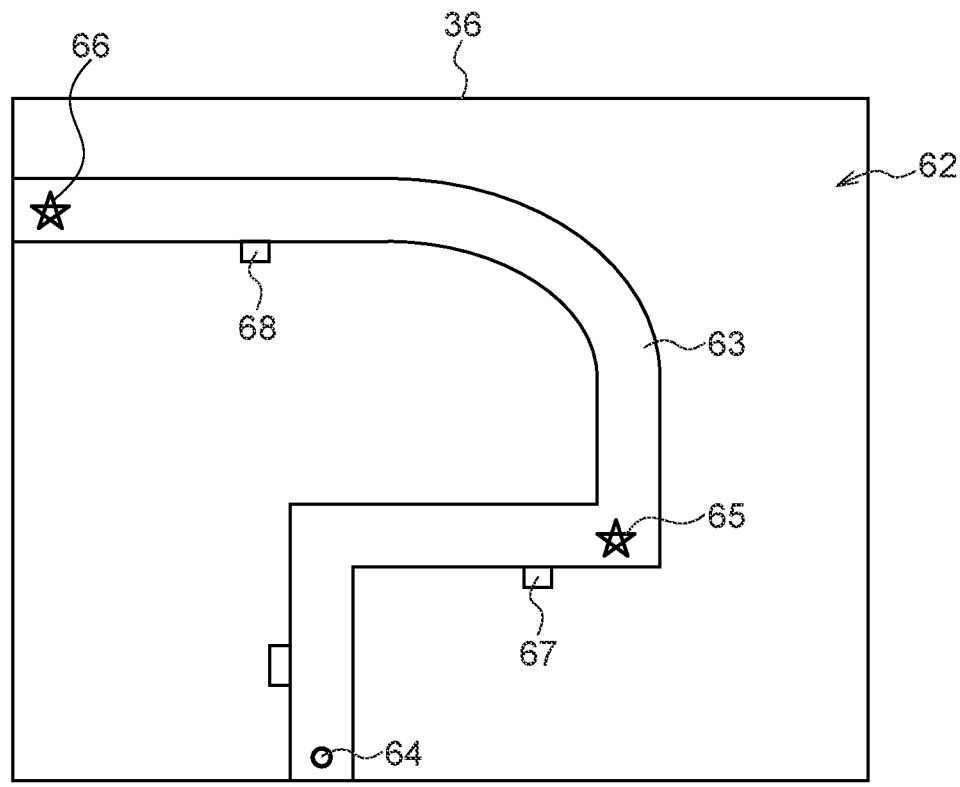
FIG. 14 is a view showing the display part when an event 1 and a special event 2 are selected.

As an example, a case in which the vehicle occupant selects the event 1 and the special event 2 and touches the confirm switch area 46 at step S40 is assumed. In this case, a map image 62 illustrated in FIG. 14 is displayed at the display part 36. A single route 63 is plotted on the map image 62. A current position 64 of the vehicle 30, a first destination 65 and a second destination 66 are displayed on the route 63. An "A" store 67 and a car servicing workshop 68 that are located along the route 63 are included in the map image 62. The map image 62 is an image based on map data recorded in the storage 31D of the vehicle 30 or map data received from a Web server by the first wireless communications device 38. A destination of the event 1 is the first destination 65, and a destination of the special event 2 is the second destination 66.

If the vehicle 30 departing from the current position 64 reaches the "A" store 67 (a predetermined location), the bonus action 2 is achieved. A staff member of the "A" store 67 uses, for example, communications equipment installed at the "A" store 67 to transmit information indicating that the vehicle 30 has reached the "A" store 67 to the driving assessment device 10.

If activation of the PCS is not detected by the ECU 31 before the current position 64 reaches the first destination 65, the event 1 is achieved. However, if the PCS is activated, PCS recording signals generated by the ECU 31 are included in the detection value data.

If the vehicle 30 departing from the current position 64 reaches the car servicing workshop 68 and the vehicle 30 is subject to at least one of inspection or servicing at the car servicing workshop 68, the bonus action 1 is achieved. A staff member of the car servicing workshop 68 uses, for example, communications equipment installed at the car servicing workshop 68 to transmit information indicating that the vehicle 30 has received at least one of inspection or servicing at the car servicing workshop 68 to the driving assessment device 10.

If a number of reversing operations of the vehicle 30 until the current position 64 reaches the car servicing workshop 68 is not more than three, the special event 2 is achieved. When the vehicle 30 performs a reversing operation, the shift lever position sensor 40 outputs a signal indicating that the shift lever is at an R position (reverse gear). This signal is included in the detection value data.

Meanwhile, when the result of the determination in step S39 is No, the ECU 31 proceeds to step S41, and the determination prohibition section 319 makes a determination as to whether a predetermined duration has passed since when the event (or special event) for which the determination in step S38 is Yes was most recently selected. This predetermined duration is, for example, 30 days.

When the result of the determination in step S41 is Yes, the ECU 31 sets the repetition count of the event (or special event) for which the determination is Yes to zero, and the ECU 31 proceeds to step S40. On the other hand, when the result of the determination in step S41 is No, the ECU 31 proceeds to step S37. That is, in this case the event (or special event) that was selected in step S37 cannot be an object of driving assessment, which is described below.

When the result of the determination in step S40 is Yes, the ECU 31 proceeds to step S42. When the result of a determination in step S42 is Yes, the ECU 31 proceeds to step S43, and the first wireless communications device 38 transmits, to the transmission/reception section 11 of the driving assessment device 10, the course flag information, all the detection value data which was recorded at the storage 31D while the ignition switch 35 was at the on position, and event information relating to the selected event(s) (and special event(s)).

When the result of the determination in step S30 or step S35 is No, or the processing of step S34 or step S43 is complete, the ECU 31 temporarily ends the processing of the flowchart in FIG. 21.

Candidate events, which are candidates for events (and special events) to be displayed at the display part 36, are generated at a server (not shown in the drawings) that is capable of communications with the driving assessment device 10 and the vehicle 30 via the Internet. The vehicle 30 successively receives information relating to updated candidate events from this server and records the information relating to the candidate events in the storage 31D. Types of events that are applicable to the vehicle 30 differ in accordance with specifications of the vehicle 30. For example, supposing a candidate event that stipulates avoiding activation of PCS is recorded in the storage 31D, if the vehicle 30 at which this storage 31D is installed is not equipped with PCS, a driver of the vehicle 30 cannot conduct an event with the details stipulated by this candidate event. Accordingly, the event specification section 317 of the ECU 31 selects details of events to be displayed at the display part 36 from a set of candidate events on the basis of specifications information of the vehicle 30. Thus, the event specification section 317 only displays at the display part 36 events (and special events) that a driver can conduct.

The designation section 318 of the vehicle 30 selects, from all the events, special events to be displayed in the campaign selection screen 55. That is, the designation section 318 designates some of the events as special events. The designation section 318 periodically updates details of the special events. That is, any of the events 1 to 3 shown in FIG. 12 can potentially be displayed in the campaign selection screen 55 as a special event. Similarly, any of the special events 1 to 3 shown in FIG. 15 can potentially be displayed in the event selection screen 48 as an event (rather than as a special event). Further, an event with different details from the events displayed in the event selection screen 48 and the campaign selection screen 55 can potentially be displayed in the event selection screen 48 by the designation section 318, and an event with different details from the events displayed in the event selection screen 48 and the campaign selection screen 55 can potentially be displayed as a special event in the campaign selection screen 55 by the designation section 318.

Now, a flow of processing carried out by the driving assessment device 10 is described using the flowchart in FIG. 22. The driving assessment device 10 executes the processing of the flowchart in FIG. 22 repeatedly, each time a predetermined interval passes.

In step S50, the assessment section 101 of the driving assessment device 10 makes a determination as to whether the transmission/reception section 11 has received course flag information and detection value data. Received course flag information and detection value data are associated with a vehicle ID and recorded in storage 10A of the driving assessment device 10.

When the result of the determination in step S50 is Yes, the driving assessment device 10 proceeds to step S51, and the assessment section 101 makes a determination as to whether a course flag represented by the received course flag information is one.

When the result of the determination in step S51 is No, the driving assessment device 10 proceeds to step S52, and the assessment section 101 conducts a driving assessment (a first driving assessment) on the basis of the received detection value data. Methods of driving assessment conducted on the basis of detection value data are widely known, for example, as disclosed in Japanese Patent Application Laid-Open (JP-A) Nos. 2019-012481 and 2020-095403. Any method may be employed as a method of driving assessment in the present disclosure. For example, the assessment section 101 performs a driving assessment of acceleration operations on the basis of detection values of the accelerator position sensor 33 and detection values of the wheel speed sensors 32, performs a driving assessment of braking operations on the basis of detection values of the brake pedal force sensor 41 and detection values of the wheel speed sensors 32, and performs a driving assessment of steering operations on the basis of detection values of the steering angle sensor 34. The assessment section 101 calculates scores for acceleration operations, braking operations and steering operations on the basis of these detection values (see FIG. 16).

On the other hand, when the result of the determination in step S51 is Yes, the driving assessment device 10 proceeds to step S53, and the assessment section 101 performs a driving assessment (a second driving assessment) on the basis of the received detection value data. The second driving assessment includes the first driving assessment, an event assessment and a bonus action assessment.

The event assessment as referred to here is an assessment of whether an event (or special event) selected and confirmed in step S40 of the flowchart in FIG. 21 has been achieved. For example, it is assumed that the event 1 and the special event 2 have been selected. If the PCS is activated as mentioned above, a PCS recording signal generated by the ECU 31 is included in the detection value data. Therefore, the assessment section 101 can identify the number of times the PCS is activated on the basis of the received PCS recording signal. When the assessment section 101 determines that the number of occasions the PCS is activated is not more than one, the event determination section 102 of the driving assessment device 10 determines that the event 1 has been achieved. Meanwhile, when the vehicle 30 performs a reversing operation, the shift lever position sensor 40 outputs signals indicating that the shift lever is disposed at the R position. The assessment section 101 receives this signal as detection value data. Therefore, on the basis of the received signals, the assessment section 101 can identify whether or not the number of occasions the vehicle 30 is reversed is three or less. When the assessment section 101 determines that the number of occasions of reversing is three or less, the event determination section 102 determines that the special event 2 has been achieved.

The assessment section 101 also carries out the bonus action assessment. For example, when information indicating that the vehicle 30 has received at least one of inspection or servicing at the car servicing workshop 68 is transmitted from the communications equipment installed at the car servicing workshop 68 to the driving assessment device 10, as described above, the assessment section 101 determines that the bonus action 1 has been achieved. For example, when information indicating that the vehicle 30 has arrived at the "A" store 67 is transmitted from the communications equipment installed at the "A" store 67 to the driving assessment device 10, as described above, the assessment section 101 determines that the bonus action 2 has been achieved. If the detection value data transmitted from the vehicle 30 to the driving assessment device 10 includes data relating to running distances and fuel consumption detected by the other detection sections, the assessment section 101 uses this data to determine whether or not the bonus action 3 has been achieved.

When the processing of step S53 is complete, the driving assessment device 10 proceeds to step S54, and the modification factor assignment section 103 sets modification factors which are decided depending on the scores of acceleration operations, braking operations and steering operations, whether or not events have been achieved, and whether or not bonus actions have been conducted. The meaning of the term "modification factor" as used herein is intended to include factors that reflect the results of the second driving assessment in a game that is implemented by the game application installed at the portable terminal 80. This game is a role-playing video game that utilizes position information. That is, when the portable terminal 80 is moved, a character appearing in the game moves on a map image displayed at the display part 81. Capabilities of the character are evaluated by three strengths: attack strength, defense strength and body strength. The character may obtain in-game money and weapons. The character can also learn predetermined magic (magic spells). The modification factors according to the present exemplary embodiment assign improvements to the above-mentioned elements representing attributes of the character (attack strength, defense strength, body strength, in-game money, weapons and magic). The greater a modification factor, the greater the extent by which an element is improved.

FIG. 17 shows an example of modification factors. The higher the score for acceleration operations, the more the attack strength is improved. The higher the score for braking operations, the more the defense strength is improved. The higher the score for steering operations, the more the body strength is improved. When the bonus action 1 is achieved, a predetermined amount of in-game money is given to the character. When the bonus action 2 is achieved, a predetermined weapon is given to the character. When the event 1 is achieved, the character learns a predetermined magic. When the special event 2 is achieved, the character learns another predetermined magic. In the present exemplary embodiment, modification factors when the special events 1 to 3 are achieved are greater than modification factors when the events 1 to 3 are achieved.

When the processing of step S54 is complete, the driving assessment device 10 proceeds to step S55, and the modification factor assignment section 103 makes a determination as to whether the transmission/reception section 11 has received the points total transmitted by the vehicle 30 in step S22. Information relating to the received points total is associated with the vehicle ID and recorded in the storage 10A of the driving assessment device 10.

When the result of the determination in step S55 is Yes, the driving assessment device 10 proceeds to step S56, and the modification factor assignment section 103 computes a coefficient by reference to a coefficient map 72 in FIG. 18. For example, when the points total of the lock points is 4, the coefficient is 2.5. When the points total of the lock points is zero, due to the portable terminal 80 being disposed in the type 1 vehicle 30A and not being locked, the coefficient is zero.

When the processing of step S52 is complete, the driving assessment device 10 proceeds to step S57, and the assessment section 101 records the results of the first driving assessment in the storage 10A. When the processing of step S56 is complete, the driving assessment device 10 proceeds to step S57, the assessment section 101 records the results of the second driving assessment in the storage 10A, and the modification factor assignment section 103 records the modification factors and the coefficient in the storage 10A.

When the processing of step S57 is complete, the driving assessment device 10 proceeds to step S58, and the transmission/reception section 11 makes a determination as to whether an assessment results transmission request has been received from the portable terminal 80.

When the result of the determination in step S58 is Yes, the driving assessment device 10 proceeds to step S59. When the processing of step S52 has been carried out, in step S59 the transmission/reception section 11 transmits the results of the first driving assessment to the first transmission/reception section 83 of the portable terminal 80. Alternatively, when the processing of step S56 has been carried out, in step S59 the transmission/reception section 11 transmits the results of the second driving assessment, the modification factors and the coefficient to the first transmission/reception section 83.

When the result of the determination in step S50 or step S58 is No, or the processing of step S59 is complete, the driving assessment device 10 temporarily ends the processing of the flowchart in FIG. 22.

Now, a flow of processing carried out by the portable terminal 80 is described using the flowchart in FIG. 23. The portable terminal 80 executes the processing of the flowchart in FIG. 23 repeatedly, each time a predetermined interval passes.

In step S60, the display part control section 803 of the portable terminal 80 makes a determination as to whether the driving assessment display application has been started.

If the result of the determination in step S60 is Yes, the portable terminal 80 proceeds to step S61, and the first transmission/reception control section 801 makes a determination as to whether the first transmission/reception section 83 has received results of a driving assessment (the first driving assessment or the second driving assessment) from the driving assessment device 10.

Figure 16:
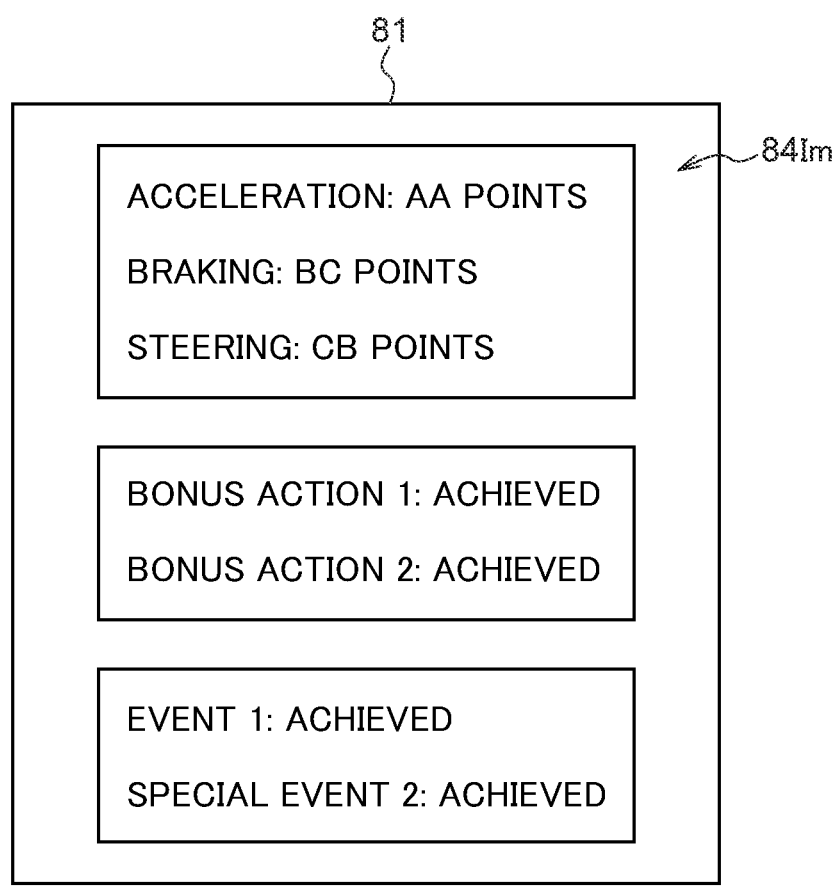
FIG. 16 is a view showing a display part of the portable terminal displaying a driving assessment results image.

When the result of the determination in step S61 is Yes, the portable terminal 80 proceeds to step S62, and the display part control section 803 displays a driving assessment results image 84Im illustrated in FIG. 16 at the display part 81.

When the result of the determination in step S60 or step S61 is No, or the processing of step S62 is complete, the portable terminal 80 temporarily ends the processing of the flowchart in FIG. 23.

Now, another flow of processing carried out by the portable terminal 80 is described using the flowchart in FIG. 24. The portable terminal 80 executes the processing of the flowchart in FIG. 24 repeatedly, each time a predetermined interval passes.

In step S70, the display part control section 803 of the portable terminal 80 makes a determination as to whether the game application has been started.

If the result of the determination in step S70 is Yes, the portable terminal 80 proceeds to step S71, and the first transmission/reception control section 801 makes a determination as to whether the first transmission/reception section 83 has received the results of a driving assessment (the first driving assessment or the second driving assessment) from the driving assessment device 10.

When the result of the determination in step S71 is Yes, the portable terminal 80 proceeds to step S72 and makes a determination as to whether the modification factors and coefficient have been received from the driving assessment device 10.

When the result of the determination in step S72 is Yes, the portable terminal 80 proceeds to step S73, and the display part control section 803 displays a modification factor display image 71 (see FIG. 17) at the display part 81. The modification factor display image 71 presents the modification factors with the coefficient applied thereto. The modification factors presented by the modification factor display image 71 in FIG. 17 are modification factors when the coefficient is 1. When, for example, the coefficient is 2, the values of attack strength, defense strength, body strength and in-game money to be assigned to the character are double the values in FIG. 17. When, for example, the coefficient is 2.5, the values of attack strength, defense strength, body strength and in-game money to be assigned to the character are 2.5 times the values in FIG. 17. Furthermore, when the coefficient is 2, the power of a weapon given to the character and the power of a magic learned by the character are double those illustrated in FIG. 17. When the coefficient is 2.5, the power of a weapon given to the character and the power of a magic learned by the character are 2.5 times those illustrated in FIG. 17.

When the processing of step S73 is complete, the portable terminal 80 proceeds to step S74, and the display part control section 803 makes a determination as to whether there is a request to switch to a main image 86 which is generated by operation of the display part 81 (the touch panel).

Figure 19:
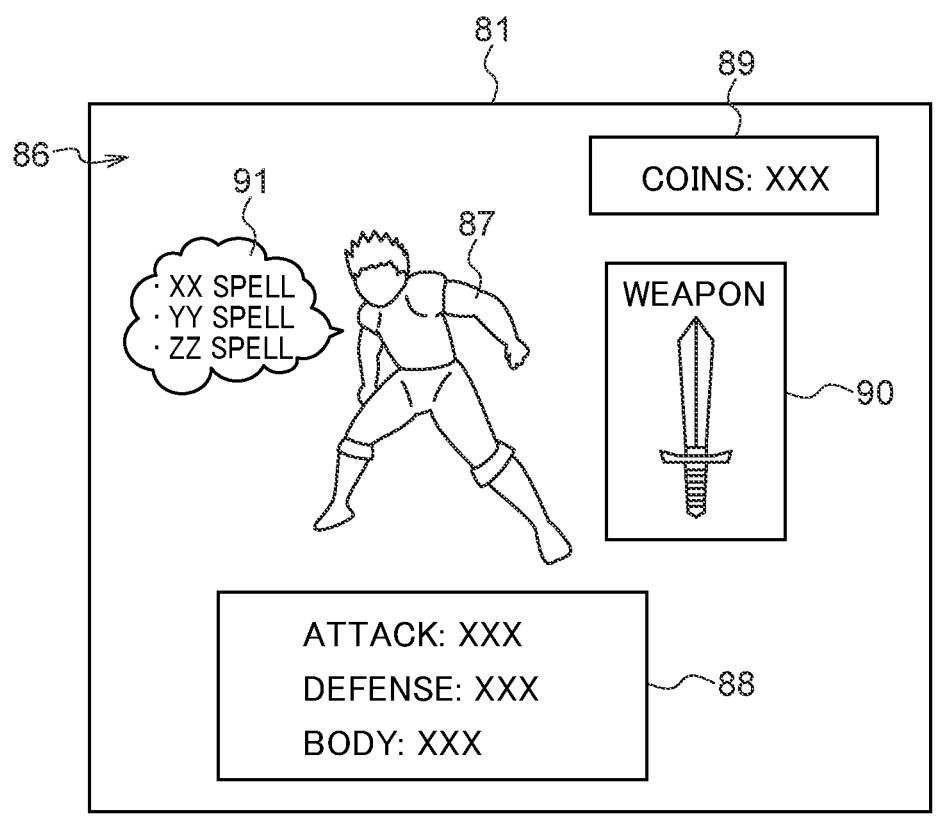
FIG. 19 is a diagram showing the display part of the portable terminal displaying a main image of a game.

When the result of the determination of step S74 is Yes, the portable terminal 80 proceeds to step S75, and the display part control section 803 displays the main image 86 illustrated in FIG. 19 at the display part 81. The main image 86 shown in FIG. 19 includes a character 87, a strength display area 88, a money display area 89, a weapon display area 90 and a magic display area 91. The attack strength, defense strength and body strength, to which the modification factors computed in step S73 have been applied, are displayed in the strength display area 88. A total amount of in-game money, to which the modification factor has been applied, is displayed in the money display area 89. A weapon that the character 87 is currently carrying, to which the modification factor has been applied, is displayed in the weapon display area 90. Magic that the character 87 has learned, to which the modification factors have been applied, are displayed in the magic display area 91.

When the result of the determination in step S70, S71 or S74 is No or the processing of step S75 is complete, the portable terminal 80 temporarily ends the processing of the flowchart in FIG. 24.

The assessment section 101 of the driving assessment device 10 according to the present exemplary embodiment as described above assesses plural driving assessment items with mutually different details (acceleration operations, braking operations, steering operations, whether or not events are achieved, and whether or not bonus actions are achieved) on the basis of driving operations of the vehicle 30. The modification factor assignment section 103 assigns modification factors that are generated in accordance with assessment results of the driving assessment items to the character 87 in the game. Accordingly, when assessment results of the plural driving assessment items are obtained, the plural modification factors with different details are assigned to the character 87. Therefore, in order to provide various modifications to the character 87, a driver must conduct driving operations that correspond with the range of driving assessment items. Thus, the driving assessment device 10 can encourage a driver to conduct driving operations such that a range of driving assessment items are assessed.

The assessment section 101 computes scores relating to the plural driving assessment items on the basis of driving operations, and the modification factor assignment section 103 generates modification factors according to the scores. Thus, the driving assessment device 10 can encourage a driver to conduct driving operations so as to produce high scores for the driving assessment items.

When the assessment section (bonus determination section) 101 determines that a predetermined bonus action has been conducted, the modification factor assignment section 103 assigns a modification factor to the character 87. Thus, the driving assessment device 10 can encourage a driver to conduct bonus actions.

When the number of times the same event is conducted is equal to or greater than a repetition limit, the driver is prohibited from conducting the same event. As a result, a probability of the driver conducting a different event from the same event is high. Thus, a driver can be encouraged to conduct driving operations such that many driving assessment items are assessed.

However, if predetermined payment processing is carried out after the same event has been conducted a predetermined times equal to or greater than the repetition limit, the determination prohibition section 319 allows the driver to conduct the same event. A driver may have a strong desire to conduct the same event (driving assessment), in this case the driving assessment device 10 allows the driver to conduct the same event.

When a predetermined duration has passed since the same event has been conducted a predetermined times equal to or greater than the repetition limit, the determination prohibition section 319 allows the driver to conduct the same event. When the predetermined duration has passed, it is meaningful for the driver to conduct the same event (driving assessment), in this case the driving assessment device 10 allows the driver to conduct the same event.

The display part 36 only displays an event which is specified to be capable of being conducted by the vehicle 30 by the event specification section 317. Therefore, a driver can easily identify events that can be conducted by looking at the display part 36.

The driver looking at the display part 36 can recognize that some of the plural events are special events. A modification factor assigned to the character 87 when a special event is conducted is greater than a modification factor assigned to the character 87 when an event that is not a special event is conducted. Thus, a driver can be encouraged to conduct special events.

The association determination section 311 of the vehicle 30 makes a determination as to whether the portable terminal 80 is associated with the vehicle 30. The lock determination section 313 makes a determination as to whether the portable terminal 80 associated with the vehicle 30 is in a lock state in which operations are restricted. The level determination section 314 determines strength levels of lock states. The display part 36 displays all current lock states, lock points of the lock states, and a points total of the lock points. Therefore, when the portable terminal 80 is set into a lock state, the driver can identify a level of the lock state. Thus, a driver can be encouraged to put the portable terminal 80 into a locked state.

When the portable terminal 80 is put into a lock state that is based only on functions of the portable terminal 80, a driver may unlock the lock state by operating the portable terminal 80 while the vehicle 30 is running. Accordingly, the level determination section 314 determines that a strength level of a linked lock state (the first linked lock state or the second linked lock state, which is a lock state based on functions of the vehicle 30), is higher than a strength level of an unlinked lock state, which is the lock state that is based only on functions of the portable terminal 80. Thus, a driver can be encouraged to select the linked lock state with a higher strength level than the unlinked lock state.

The first linked lock state, which is a state of locking when running of the vehicle 30 is detected, may be unlocked when the vehicle 30 stops. Meanwhile, the second locked linked lock state, which is a state of locking when the ignition switch 35 is detected as being at the on position, cannot be unlocked unless the ignition switch 35 is operated to the off position. Accordingly, the level determination section 314 determines that the strength level of the second linked lock state is higher than the strength level of the first linked lock state. Thus, a driver can be encouraged to buy or rent the type 3 vehicle 30C in which the portable terminal 80 is set to the second linked lock state when the ignition switch 35 is detected as being at the on position.

The higher the strength level of the lock state determined by the level determination section 314, the greater the coefficient. That is, the higher the strength level, the greater the modification factors. Thus, a driver can be encouraged to select the linked lock state (the first linked lock state or the second linked lock state) with a higher strength level than the unlinked lock state.

The driving assessment device 10, driving assessment method and non-transitory recording medium according to the exemplary embodiment are described above, but the driving assessment device 10, driving assessment method and non-transitory recording medium may be suitably modified within a technical scope not departing from the gist of the present disclosure.

The driving assessment items conducted by the driving assessment device 10 may be different objects from those described above. For example, events (and special events) and bonus actions with different details from those described above may be included in the driving assessment items. Driving operations other than acceleration operations, braking operations and steering operations may be included in the driving assessment items. Further, only a subset of acceleration operations, of braking operations and of steering operations may be included in the driving assessment items. There may be a single event or bonus action. An event may be specified with the same details as the details of a bonus action described above. A bonus action may be specified with the same details as the details of an event described above.

The modification factors may be different from those described above. For example, when the game allows a player who is using the portable terminal 80 to play the game to select different characters from the character 87, a modification factor may be a right to allow the player to select a different character. Another modification factor may be a right to allow a player to take part in a random draw to obtain in-game money, a weapon or the like.

A modification factor may be a right to allow a player to select an additional character that is different from a character which has been operating in the game. For example, when a predetermined event is achieved, the modification factor assignment section 103 may generate a modification factor for the player to additionally select a different character. The modification factor assignment section 103 may then assign various modification factors to the selected characters.

The game application may be a program that allows players to arbitrarily select plural characters. That is, a player may be able to select plural arbitrary characters regardless of driving assessments. In this case, when, for example, a predetermined event is achieved, the modification factor assignment section 103 may allow modification factors to be assigned to one or more selected characters.

When a modification factor is the right to select an additional different character and when a player can arbitrarily select plural characters, then, for example, in order to cultivate a different character after one character has been comprehensively cultivated, a driver must continue driving operations such that the range of driving assessment items are assessed. That is, the driver needs to continue driving operations using the driving assessment application 31AP2. Thus, the driving assessment device 10 according to these variant examples can encourage a driver to conduct driving operations such that a range of driving assessment items are assessed.

The driving assessment display application and game application may be installed at the ECU 31 of the vehicle 30. In this configuration, the driving assessment results image 84Im and game images (the modification factor display image 71, the main image 86 and so forth) are displayed at the display part 36 (an operation terminal).

The event determination section 102 may be capable of identifying an accuracy of determination as to whether an event has been conducted, for each event. In this case, when an event (a second event) with a high determination accuracy among plural events is achieved, modification factors generated by the modification factor assignment section 103 may be greater than modification factors generated when an event (a first event) with a lower determination accuracy than the second event is achieved. A determination accuracy may be set in accordance with types of information used for the determination. For example, when data that is the basis for determining whether or not an event is achieved is data that is detected by the detection sections of the vehicle 30, the determination accuracy of the determination is high. In contrast, when the data that is the basis for determining whether or not an event is achieved is data that is different from data detected by the detection sections of the vehicle 30, the determination accuracy of the determination is low. This different data is, for example, position information of the vehicle acquired by a portable terminal or information sent from an "A" store. For example, when the event determination section 102 uses position information of the vehicle acquired by a portable terminal to make a determination as to whether an event has been achieved, the determination accuracy of this determination is low. This variant example can encourage a driver to conduct events with higher determination accuracies.

The designation section 318 may select an event that a driver can conduct and may display the selected event at the display part 36. That is, the driver conducts only the event displayed at the display part 36 rather than being able to select an event that the driver wants to conduct from plural events. In this configuration, the designation section 318 may display plural events at the display part 36.

It is assumed that an event is designated as a special event for a predetermined period. The predetermined period includes a first time, which is an arbitrary time, and a second time, which is an arbitrary time subsequent to the first time. In this situation, a magnitude of a modification factor when a special event is conducted at the second time may be made greater than a magnitude of a modification factor when the same special event is conducted at the first time. In this case, a driver looking at the display part 36 becomes more likely to decide to conduct the special event as time remaining in the predetermined period decreases. Therefore, the driver becomes easy to conduct the special event.

The driving assessment device 10 may be provided with a group specification section that, as functions thereof, acquires driving assessment results from a plural number of the vehicle 30 and, on the basis of plural acquired driving assessment results, specifies a target group including plural drivers having similar driving assessment characteristics. On the basis of the numerous driving assessment results, the event determination section 102 then specifies a target event that is an event for which driving assessments that the target group have conducted produced driving assessment results below a predetermined level. When the event determination section 102 determines that the target event is achieved by a driver in the target group, the modification factor assignment section 103 generates a modification factor larger than when an event that is not a target event is achieved by a driver in the target group, and assigns the modification factor(s) to the character 87. Thus, the probability of a driver conducting an event that is difficult for them is raised, and the driver can be encouraged to perform driving operations such that many driving assessment items are assessed.

The functions of one or more of the assessment section 101, the event determination section 102, the modification factor assignment section 103 and the group specification section may be provided by the ECU 31.

The functions of one or more of the association determination section 311, the specification section 312A, the specification section 312B, the lock determination section 313, the level determination section 314, the event specification section 317, the designation section 318 and the determination prohibition section 319 may be provided by the driving assessment device 10.

The detection sections may be any kind of detection section that detects a physical quantity that varies in accordance with at least one of running, steering or braking of the vehicle 30 or a physical quantity that varies in accordance with operation of a predetermined operation member. For example, such a detection section may be a sensor that measures an engine coolant temperature, a yaw rate sensor or the like. There may be any number of detection sections.

The driving assessment device 10 need not be connected to the Internet. In this case, for example, detection value data acquired from the vehicle 30 is memorized at a portable recording medium (for example, a USB Flash drive) and the detection value data on the recording medium is copied to storage 10A of the driving assessment device 10.

In place of the GPS receiver 37, the vehicle 30 may be equipped with a receiver that is capable of receiving information from satellites of a global navigation satellite system other than GPS (for example, GALILEO).

What is claimed is:

1. A driving assessment device comprising a processor, the processor being configured to:
   receive data from a wheel speed sensor, an accelerator position sensor, a steering angle sensor, a GPS receiver, a shift lever position sensor, and a brake pedal force sensor;
   display an event selection screen, which displays a plurality of events associated with driving actions;
   receive a selection of one of the events from a user;
   assess a plurality of driving assessment items with mutually different details, based on driving operations of a vehicle, the received data, and the driving actions associated with the event selected by the user; and
   assign a modification factor generated in accordance with an assessment result of the driving assessment items to a character in a game, the game being displayed at a display part of an operation terminal by execution of a game application.

2. The driving assessment device according to claim 1, wherein:
   a plurality of characters are selectable in the game, and
   the processor is configured to assign the modification factor to one or more characters that are selected among the plurality of characters.

3. The driving assessment device according to claim 1, wherein the processor is configured to:
   compute a score relating to the driving assessment items based on of the driving operations; and
   generate the modification factor in accordance with the score of the driving assessment items, and assign the generated modification factor to the character.

4. The driving assessment device according to claim 1, wherein the processor is configured to:
   make a determination as to whether a predetermined bonus action has been conducted; and
   in a case in which the processor determines that the bonus action has been conducted, assign the modification factor to the character.

5. The driving assessment device according to claim 4, wherein the bonus action is at least one of:
   inspection or servicing of the vehicle,
   movement to a predetermined location,
   running at least a predetermined running distance, or
   making fuel consumption during running a predetermined value or less.

6. A driving assessment method comprising, using a processor:
   receiving data from a wheel speed sensor, an accelerator position sensor, a steering angle sensor, a GPS receiver, a shift lever position sensor, and a brake pedal force sensor;
   displaying an event selection screen, which displays a plurality of events associated with driving actions;
   receiving a selection of one of the events from a user;
   assessing a plurality of driving assessment items with mutually different details, based on driving operations of a vehicle, the received data, and the driving actions associated with the event selected by the user; and
   assigning a modification factor generated in accordance with an assessment result of the driving assessment items to a character in a game, the game being displayed at a display part of an operation terminal by execution of a game application.

7. A non-transitory recording medium storing a program that is executable by a computer to execute processing, the processing comprising:
   receiving data from a wheel speed sensor, an accelerator position sensor, a steering angle sensor, a GPS receiver, a shift lever position sensor, and a brake pedal force sensor;
   displaying an event selection screen, which displays a plurality of events associated with driving actions;
   receiving an event selection selected by a user;
   assessing a plurality of driving assessment items with mutually different details, based on driving operations of a vehicle, the received data, and the driving actions associated with the event selected by the user; and
   assigning a modification factor generated in accordance with an assessment result of the driving assessment items to a character in a game, the game being displayed at a display part of an operation terminal by execution of a game application.

* * * * *